(12) United States Patent
Noh et al.

(10) Patent No.: US 11,054,857 B2
(45) Date of Patent: Jul. 6, 2021

(54) FOLDABLE DISPLAY DEVICE AND SOUND PROVIDING METHOD THEREOF

(71) Applicant: Samsung Display Co., Ltd., Yongin-si (KR)

(72) Inventors: Jung Hun Noh, Yongin-si (KR); Eun Kyung Yeon, Suwon-si (KR); Yi Joon Ahn, Seoul (KR)

(73) Assignee: Samsung Display Co., Ltd., Yongin-si (KR)

(*) Notice: Subject to any disclaimer, the term of this patent is extended or adjusted under 35 U.S.C. 154(b) by 0 days.

(21) Appl. No.: 16/824,438

(22) Filed: Mar. 19, 2020

(65) Prior Publication Data

US 2020/0401187 A1 Dec. 24, 2020

(30) Foreign Application Priority Data

Jun. 21, 2019 (KR) .................. 10-2019-0074363

(51) Int. Cl.
*G06F 1/16* (2006.01)

(52) U.S. Cl.
CPC .......... *G06F 1/1616* (2013.01); *G06F 1/1688* (2013.01)

(58) Field of Classification Search
CPC combination set(s) only.
See application file for complete search history.

(56) References Cited

U.S. PATENT DOCUMENTS

| | | | | |
|---|---|---|---|---|
| 8,787,016 | B2* | 7/2014 | Rothkopf | G06F 1/1681 361/679.55 |
| 9,639,177 | B2* | 5/2017 | Kim | G06F 3/0346 |
| 10,104,787 | B2* | 10/2018 | Rothkopf | G06F 1/1652 |
| 10,152,088 | B2* | 12/2018 | Ka | G06F 1/1688 |
| 10,200,772 | B2* | 2/2019 | Ahn | H04R 1/028 |
| 10,248,224 | B2* | 4/2019 | Klein | G06F 1/1694 |
| 10,254,863 | B2* | 4/2019 | Shin | H04M 1/0216 |
| 10,485,115 | B1* | 11/2019 | Cromer | G06F 1/1683 |
| 10,564,675 | B2* | 2/2020 | Ka | G06F 1/1616 |
| 10,601,967 | B1* | 3/2020 | Harmon | H04M 1/0214 |
| 10,701,193 | B2* | 6/2020 | Harmon | H04M 1/0214 |
| 10,701,818 | B2* | 6/2020 | Cromer | G06F 1/1677 |
| 2013/0321340 | A1 | 12/2013 | Seo et al. | |
| 2015/0331453 | A1 | 11/2015 | Kim et al. | |
| 2015/0346866 | A1 | 12/2015 | Kusunoki et al. | |
| 2016/0085369 | A1 | 3/2016 | Kim et al. | |
| 2016/0116944 | A1* | 4/2016 | Lee | H04M 1/0216 361/679.26 |

(Continued)

FOREIGN PATENT DOCUMENTS

| | | |
|---|---|---|
| KR | 10-2017-0115124 A | 10/2017 |
| KR | 10-2018-0114732 A | 10/2018 |
| KR | 10-2020-0115791 A | 10/2020 |

*Primary Examiner* — Lisa Lea-Edmonds
(74) *Attorney, Agent, or Firm* — Lewis Roca Rothgerber Christie LLP

(57) ABSTRACT

A foldable display device includes: a display panel including a first area and a second area that are symmetrical with respect to a folding axis; a lower member below the display panel; a first sound output unit on a lower surface of the first area; a first fixing part above the lower surface of the first area and overlapping the first sound output unit in a thickness direction; and a first vibration output unit on a lower surface of the second area, wherein the first fixing part and the first vibration output unit are symmetrical with respect to the folding axis.

19 Claims, 24 Drawing Sheets

(56) References Cited

U.S. PATENT DOCUMENTS

| | | | |
|---|---|---|---|
| 2016/0147362 A1* | 5/2016 | Eim | G06F 1/1652 |
| | | | 345/173 |
| 2017/0052566 A1* | 2/2017 | Ka | G06F 1/1694 |
| 2018/0035208 A1* | 2/2018 | Choi | G06F 3/165 |
| 2018/0167604 A1 | 6/2018 | Imaizumi et al. | |
| 2019/0116406 A1* | 4/2019 | Ahn | H04M 1/03 |
| 2019/0369668 A1* | 12/2019 | Kim | G06F 1/1616 |
| 2019/0394890 A1* | 12/2019 | Cromer | H05K 5/0017 |
| 2020/0036198 A1* | 1/2020 | Kim | G06F 1/263 |
| 2020/0218353 A1* | 7/2020 | Song | G06F 3/016 |
| 2020/0264659 A1* | 8/2020 | Kim | G06F 1/3293 |
| 2020/0265799 A1* | 8/2020 | Choi | G01B 7/30 |
| 2020/0314513 A1 | 10/2020 | Park et al. | |

* cited by examiner

FOLDABLE DISPLAY DEVICE AND SOUND PROVIDING METHOD THEREOF

CROSS-REFERENCE TO RELATED APPLICATION

This application claims priority to and the benefit of Korean Patent Application No. 10-2019-0074363 filed on Jun. 21, 2019, in the Korean Intellectual Property Office, the disclosure of which is incorporated herein by reference in its entirety.

BACKGROUND

1. Field

Aspects of some example embodiments of the present disclosure relate to a foldable display device and a sound providing method thereof.

2. Description of the Related Art

With development into an information society, various demands are increasing on display devices for displaying images. For example, display devices may be utilized for various electronic devices, such as smartphones, tablet personal computers (PCs), digital cameras, laptop computers, navigation devices, and smart televisions.

In display devices applied to small electronic devices such as smartphones and tablet PCs, a foldable display device that is flexible and may be folded or bent may be utilized to increase portability. The foldable display device may be used by being folded or unfolded by a user, and thus, the foldable display device may be greatly reduced in volume, thereby increasing portability.

A foldable display device may include a display panel for displaying an image and a sound generation device for providing sound. Because the foldable display device may be used in a folded or unfolded state, a position where the sound generation device is located may be restricted. In addition, there may be a desire for the foldable display device to provide a high quality or optimal sound regardless of whether a user uses the foldable display device in a folded state or in an unfolded state.

The above information disclosed in this Background section is only for enhancement of understanding of the background and therefore the information discussed in this Background section does not necessarily constitute prior art.

SUMMARY

Aspects of some example embodiments of the present disclosure provide a foldable display device that maintains a folded state by fixing a sound output unit and a vibration output unit using a magnetic fixing member.

Aspects of some example embodiments of the present disclosure also provide a foldable display device capable of improving sound quality by fixing a sound output unit and a vibration output unit using a magnetic fixing member.

It should be noted that characteristics of embodiments according to the present disclosure are not limited to the above-described objects, and other characteristics of embodiments according to the present disclosure will be more apparent to those skilled in the art from the following descriptions.

According to one or more example embodiments of the invention, a foldable display device comprises: a display panel including a first area and a second area that are symmetrical with respect to a folding axis, a lower member below the display panel, a first sound output unit on a lower surface of the first area, a first fixing part above the lower surface of the first area to overlap the first sound output unit in a thickness direction, and a first vibration output unit on a lower surface of the second area, the first fixing part and the first vibration output unit are symmetrical with respect to the folding axis.

According to some example embodiments, the first fixing part may comprise a magnetic material having a magnetic force.

According to some example embodiments, the first sound output unit and the first fixing part may be spaced apart from each other in the thickness direction.

According to some example embodiments, the lower member may comprise: a cover panel below the display panel, a middle frame below the cover panel, a circuit board below the middle frame, and a bottom cover below the circuit board.

According to some example embodiments, the first sound output unit and the first vibration output unit may do not overlap the cover panel in the thickness direction and may be coupled to the display panel by a first adhesive member.

According to some example embodiments, the first fixing part may do not overlap the middle frame and the circuit board.

According to some example embodiments, the first fixing part may overlap the bottom cover, and a first surface of the first fixing part may be coupled to the bottom cover by a second adhesive member.

According to some example embodiments, a second surface of the first fixing part, which is a surface opposite to the first surface of the first fixing part, may be coupled to the cover panel by a third adhesive member.

According to some example embodiments, the first vibration output unit may do not overlap the cover panel, the middle frame, and the circuit board in the thickness direction.

According to some example embodiments, a first surface of the first vibration output unit may be coupled to the display panel by a fourth adhesive member, and a second surface of the first vibration output unit, which is a surface opposite to the first surface of the first vibration output unit, may be coupled to the bottom cover by a fifth adhesive member.

According to some example embodiments, the first vibration output unit may comprise a lower chassis, a flexible circuit board, a voice coil, a magnet, a spring, and an upper chassis.

According to some example embodiments, the first sound output unit may generate sound of a mid-to-high frequency band, and the first vibration output unit may generate sound of a low-frequency band.

According to some example embodiments, the foldable display device may further comprise a second vibration output unit on the lower surface of the first area, a second sound output unit on the lower surface of the second area, and a second fixing part above the lower surface of the second area to overlap the second sound output unit in the thickness direction.

According to some example embodiments, the second fixing part and the second vibration output unit may be symmetrical with respect to the folding axis.

According to some example embodiments, the second fixing part may comprise a magnetic material having a magnetic force, and the second vibration output unit may comprise a lower chassis, a flexible circuit board, a voice coil, a magnet, a spring, and an upper chassis.

According to one or more example embodiments of the invention, a foldable display device comprises: a display panel including a first area and a second area that are symmetrical with respect to a folding axis, a lower member below the display panel, a first sound output unit on a lower surface of the first area, a first fixing part above the lower surface of the first area to overlap the first sound output unit in a thickness direction, a second fixing part above the lower surface of the first area, a first vibration output unit on the lower surface of the first area at a position between the first sound output unit and the second fixing part, a third fixing part above the lower surface of the first area at a position between the first sound output unit and the second fixing part, a second sound output unit on a lower surface of the second area, a fourth fixing part above the lower surface of the second area to overlap the second sound output unit in the thickness direction, a fifth fixing part above the lower surface of the second area, a second vibration output unit on the lower surface of the second area at a position between the second sound output unit and the fourth fixing part, and a sixth fixing part above the lower surface of the second area at a position between the second sound output unit and the fourth fixing part, the first fixing part and the fifth fixing part are symmetrical with respect to the folding axis, the second fixing part and the fourth fixing part are symmetrical with respect to the folding axis, and the third fixing part and the sixth fixing part are symmetrical with respect to the folding axis.

According to some example embodiments, each of the first to sixth fixing parts may comprise a magnetic material having a magnetic force.

According to some example embodiments, each of the first and second vibration output units may comprise a lower chassis, a flexible circuit board, a voice coil, a magnet, a spring, and an upper chassis.

According to some example embodiments, the lower member may comprise: a cover panel below the display panel, a middle frame below the cover panel, a circuit board below the middle frame, and a bottom cover below the circuit board.

According to some example embodiments, the first fixing part and the fourth fixing part do not overlap the middle frame and the circuit board.

According to some example embodiments of the present disclosure, a foldable display device may maintain a folded state by fixing a sound output unit and a vibration output unit using a magnetic fixing member.

According to some example embodiments of the present disclosure, a foldable display device may be capable of improving sound quality by fixing a sound output unit and a vibration output unit using a magnetic fixing member.

It should be noted that effects of the present disclosure are not limited to those described above and other effects of the present disclosure will be apparent to those skilled in the art from the following descriptions.

BRIEF DESCRIPTION OF THE DRAWINGS

The above and other aspects and features of the present disclosure will become more apparent by describing example embodiments thereof in more detail with reference to the attached drawings, in which.

DETAILED DESCRIPTION

Figure 1:
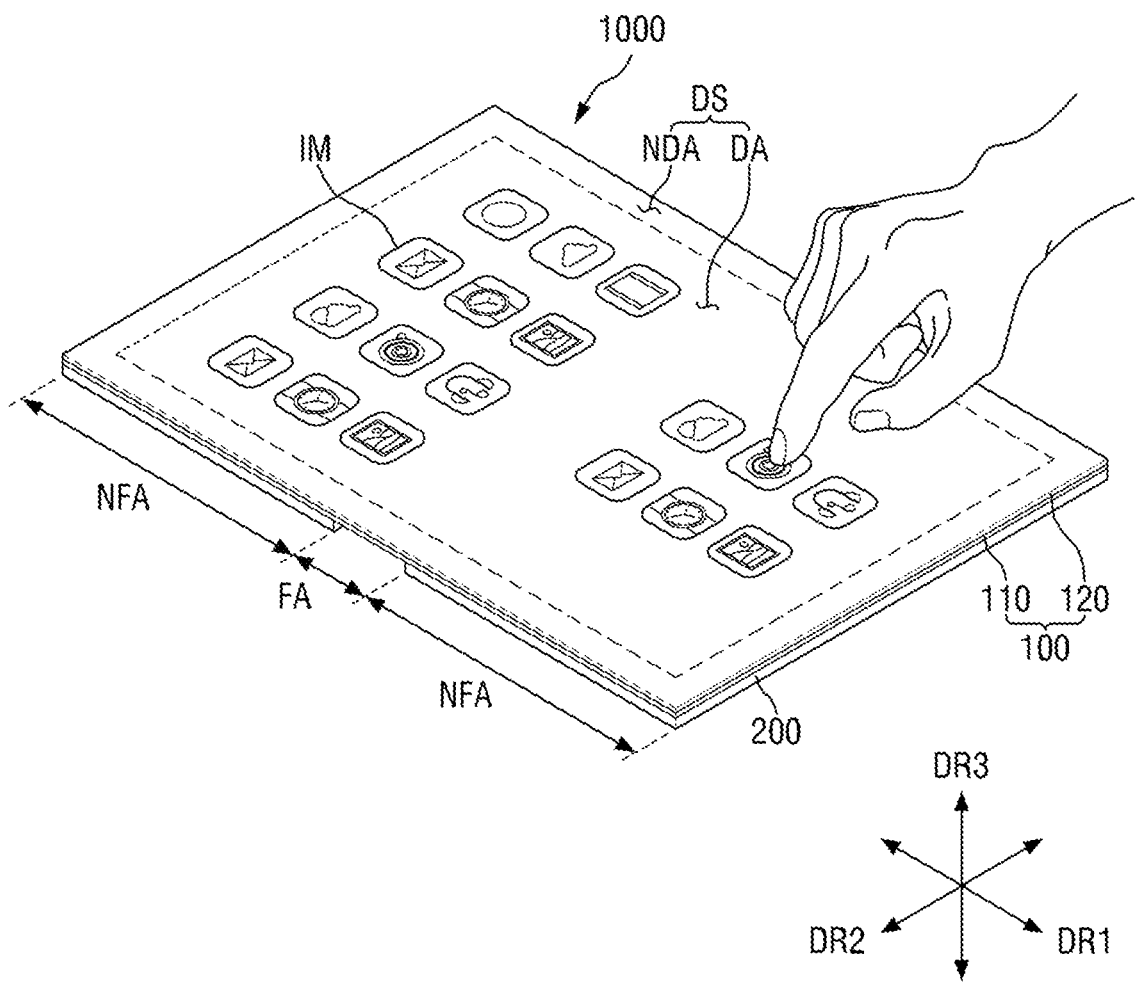
FIG. 1 is a perspective view of a display device according to some example embodiments of the present disclosure.

In the following description, for the purposes of explanation, numerous specific details are set forth in order to provide a more thorough understanding of various example embodiments or implementations of the invention. As used herein "embodiments" and "implementations" are interchangeable words that are non-limiting examples of devices or methods employing one or more of the inventive concepts disclosed herein. It is apparent, however, that various example embodiments may be practiced without these specific details or with one or more equivalent arrangements. In other instances, well-known structures and devices are shown in block diagram form in order to avoid unnecessarily obscuring various example embodiments. Further, various example embodiments may be different, but do not have to be exclusive. For example, specific shapes, configurations, and characteristics of an example embodiment may be used or implemented in another example embodiment without departing from the inventive concepts.

Unless otherwise specified, the illustrated example embodiments are to be understood as providing example features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an example embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the X-axis, the Y-axis, and the Z-axis are not limited to three axes of a rectangular coordinate system, such as the x, y, and z axes, and may be interpreted in a broader sense. For example, the X-axis, the Y-axis, and the Z-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the example term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various example embodiments are described herein with reference to sectional and/or exploded illustrations that are schematic illustrations of idealized example embodiments and/or intermediate structures. As such, variations from the shapes of the illustrations as a result, for example, of manufacturing techniques and/or tolerances, are to be expected. Thus, example embodiments disclosed herein should not necessarily be construed as being limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

As customary in the field, some example embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some example embodiments may be physically separated into two or more interacting and discrete blocks, units, and/or modules without departing from the scope of the inventive concepts. Further, the blocks, units, and/or modules of some example embodiments may be physically combined into more complex blocks, units, and/or modules without departing from the scope of the inventive concepts.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Figure 2:
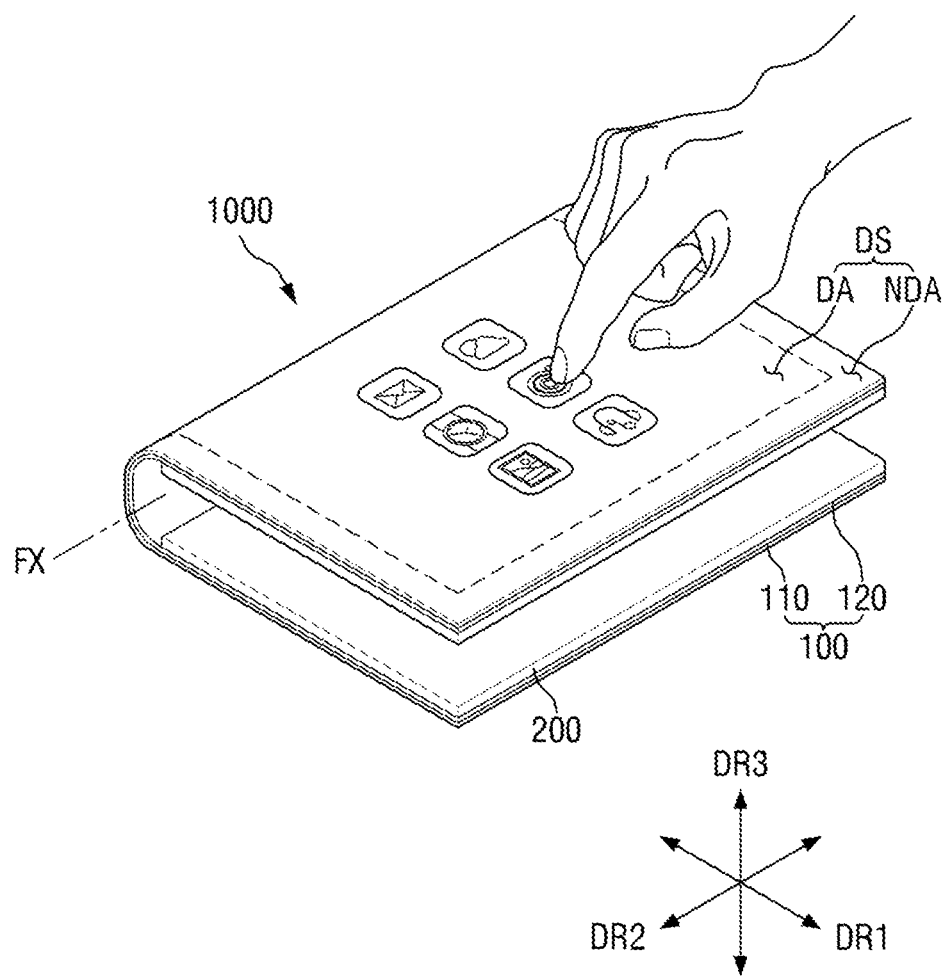
FIG. 2 is a view illustrating a state in which the display device illustrated in FIG. 1 is out-folded.

FIG. 1 is a perspective view of a display device according to some example embodiments of the present disclosure. FIG. 2 is a view illustrating a state in which the display device illustrated in FIG. 1 is out-folded.

Thus, a foldable display device 1000 according to some example embodiments may be configured to display images on various surfaces, depending on whether the display device 1000 is in a folded or unfolded state. Additionally, as will be described in more detail below, according to some example embodiments, the display device 1000 may be configured to determine or detect the relative orientation of the display device 1000 and also whether the display device 1000 is in a folded or unfolded state, and adjust the audio or sound output according to the orientation and folded-state determination.

Referring to FIGS. 1 and 2, a foldable display device 1000 according to some example embodiments of the present disclosure may have a rectangular shape having long sides in a first direction DR1 and short sides in a second direction DR2 crossing the first direction DR1. However, the present disclosure is not limited thereto, and the foldable display device 1000 may have various suitable shapes according to the design of the foldable display device 1000. The foldable display device 1000 may be a flexible display device and may be a folding display device that is folded or unfolded around a folding axis FX that extends in the second direction DR2.

The foldable display device 1000 may be divided into a plurality of areas by folding. For example, the foldable display device 1000 may be divided into a folded area FA in which the foldable display device 1000 is folded and two non-folded areas NFA that are flat. The non-folded areas NFA are arranged in the first direction DR1 and the folded area FA is located between the two non-folded areas NFA. According to some example embodiments, one folded area FA is defined in the foldable display device 1000, but the present disclosure is not limited thereto, and a plurality of folded areas may be defined in the foldable display device 1000.

The folding axis FX extends in the second direction DR2 to provide a rotation axis to the foldable display device 1000. The folded area FA overlaps the folding axis FX, and the foldable display device 1000 may be folded around the folding axis FX.

The foldable display device 1000 includes a display module 100 and lower members 200 that are located below the display module 100. An upper surface of the display module 100 may be defined as a display surface DS and may have a plane surface parallel to the first direction DR1 and the second direction DR2. Images IM, which are generated in the display module 100, may be provided to a user through the display surface DS.

The display surface DS includes a display area DA and a non-display area NDA around the display area DA. An image may be displayed on the display area DA and may not be displayed on the non-display area NDA. The non-display area NDA may surround the display area DA and provide an edge portion of the foldable display device 1000, which is printed with a color (e.g., a set predetermined color).

The display module 100 has flexibility and includes a display panel 110 and a touch sensing unit 120 that is located on the display panel 110. The display panel 110 may generate an image and provide the image to the user. The display panel 110 may include a liquid crystal display panel, an organic light-emitting display panel including an organic light-emitting diode (OLED) or a quantum dot electroluminescence (QD-EL) device, an electrophoretic display panel, or an electrowetting display panel, and, in addition, may include any one of various display panels that may display images.

Quantum dots are semiconductor materials with a crystalline structure of several nanoscales and are composed of hundreds to thousands of atoms. The quantum dots are very small in size and thus have a large surface area per unit volume, and most atoms are present on surfaces of nanocrystals to exhibit a quantum confinement effect or the like. Due to the quantum confinement effect, an emission wavelength may be adjusted only by adjusting a size of the quantum dot, and characteristics such as excellent color purity and high photoluminescence (PL) emission efficiency may be provided. The QD-EL device may be a three-layered device that includes a hole transporting layer (HTL) and an electron transporting layer (ETL) which are located on both ends thereof with a quantum dot light-emitting layer interposed therebetween.

The touch sensing unit 120 may sense an external input (such as a user's hand or a touch pen), convert the external input into an input signal (e.g., a set or predetermined input signal), and provide the input signal to the display panel 110. The touch sensing unit 120 may include a plurality of touch sensor parts for sensing the external input. The touch sensor parts may sense the external input in a capacitance manner. The display panel 110 may receive the input signal from the touch sensing unit 120 and generate an image corresponding to the input signal.

The lower members 200 may support the display module 100 and may be spaced apart from each other with respect to the folding axis FX. However, the present disclosure is not not limited thereto, and the lower members 200 may be integrally formed on a lower surface of the display module 100.

More specific configurations of the lower member 200 will be described in more detail below with reference to FIGS. 3 to 5. Hereinafter, a direction crossing a plane parallel to the first direction DR1 and the second direction DR2 is defined as a third direction DR3. The third direction DR3 may include an upper direction and a lower direction that is a direction opposite to the upper direction.

Figure 3:
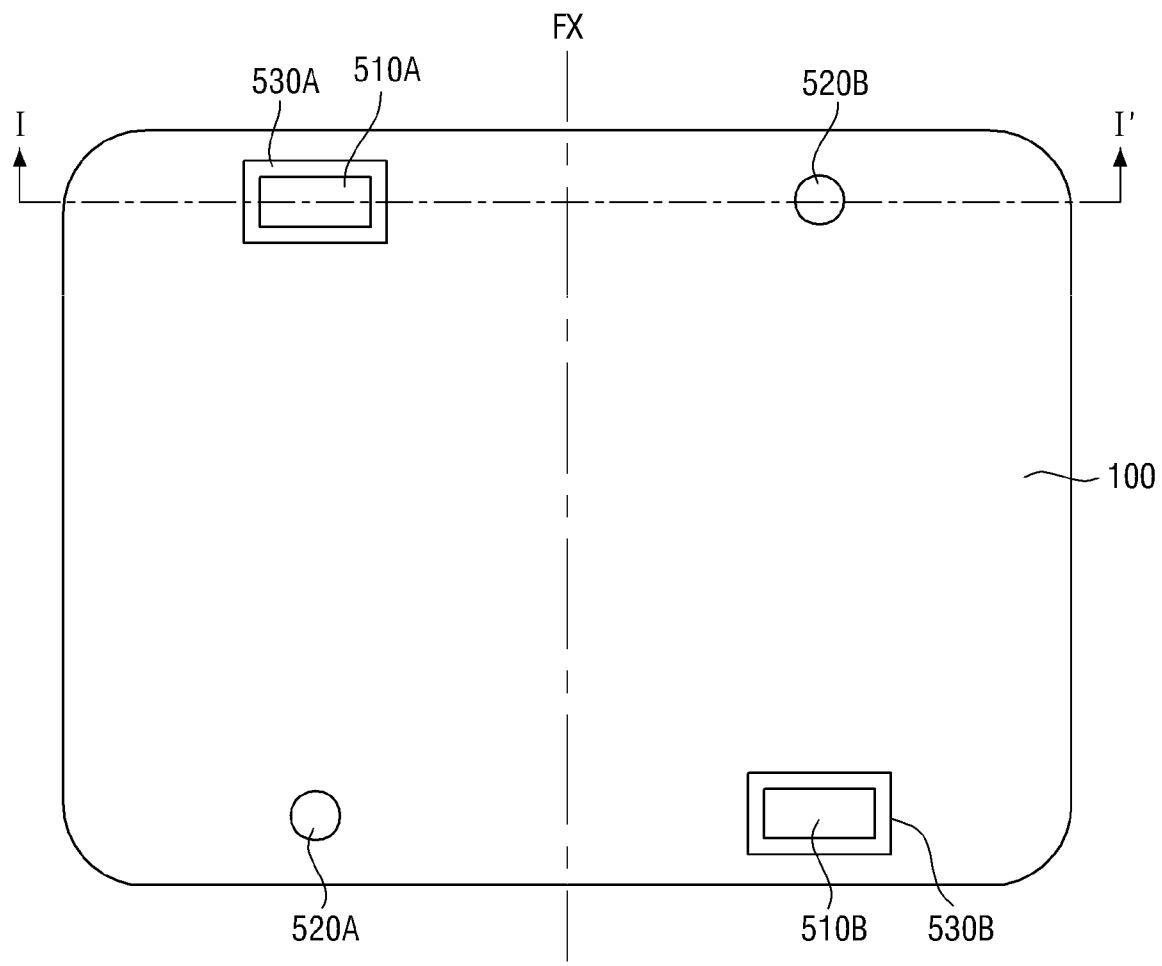
FIG. 3 is a plan view illustrating an arrangement state of a sound output unit and a vibration output unit that are in a display panel according to some example embodiments of the present disclosure.

FIG. 3 is a plan view illustrating an arrangement state of a sound output unit and a vibration output unit that are located in a display panel according to some example embodiments. FIG. 4 is a cross-sectional view illustrating a cross-section taken along the line I-I' of FIG. 3. FIG. 5 is a cross-sectional view illustrating an example of a display area of the display panel of FIG. 3.

Figure 4:
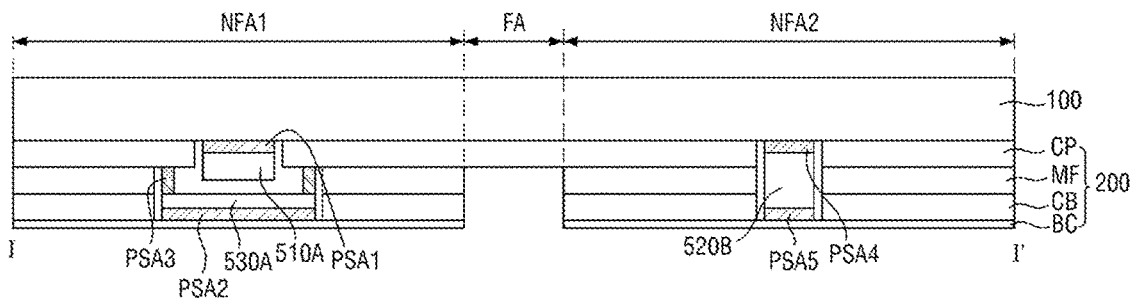
FIG. 4 is a cross-sectional view illustrating a cross-section taken along the line I-I' of FIG. 3.
Figure 5:
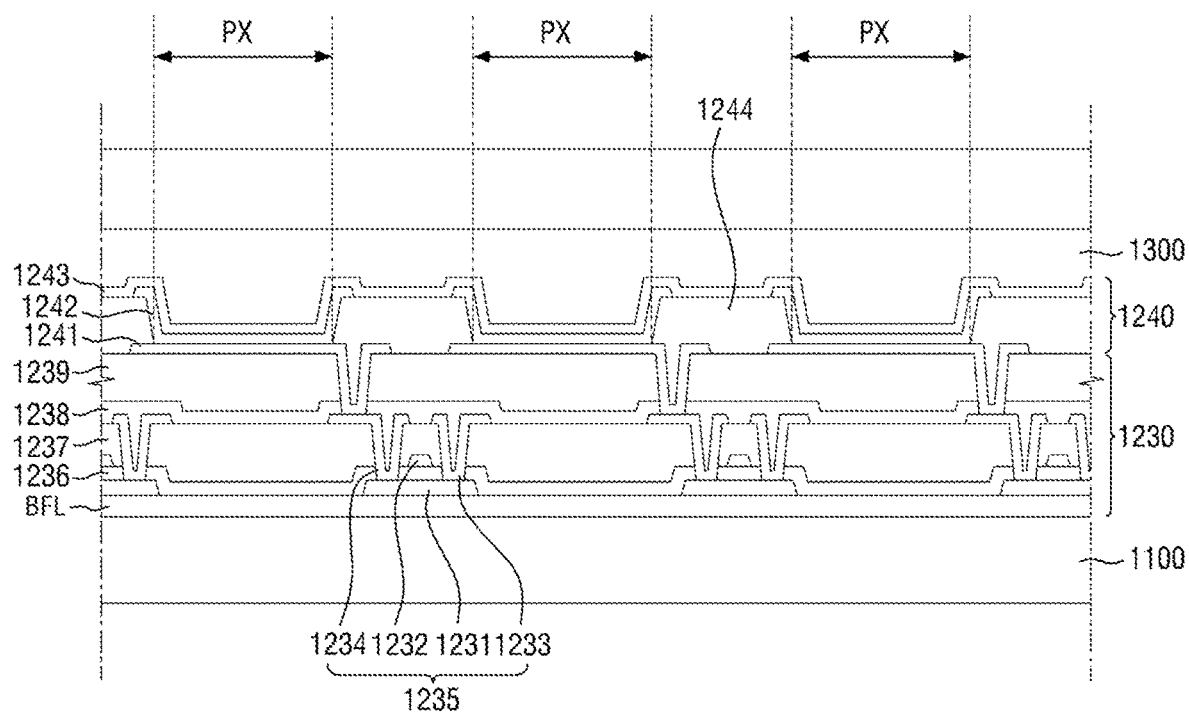
FIG. 5 is a cross-sectional view illustrating an example of a display area of the display panel of FIG. 3.

Referring to FIGS. 3 to 5, the foldable display device 1000 according to some example embodiments may include a display module 100, a lower member 200, a sound output unit 510, a vibration output unit 520, and a fixing part 530.

The display module 100 may include a display panel 110 and a touch sensing unit 120. The display panel 110 may include a substrate 1100 and a pixel array layer PAL. The pixel array layer PAL may include a buffer film BFL, a thin-film transistor layer 1230, a light-emitting element layer 1240, and a thin-film encapsulation layer 1300 as shown in FIG. 5.

The substrate 1100 may be a rigid substrate or a flexible substrate that is bendable, foldable, and rollable. The substrate 1100 may be formed of an insulating material such as glass, quartz, or polymer resin. Examples of the polymer resin may include polyethersulfone (PES), polyacrylate (PA), polyarylate (PAR), polyetherimide (PEI), polyethylenenaphthalate (PEN), polyethyleneterephthalate (PET), polyphenylenesulfide (PPS), polyallylate, polyimide (PI), polycarbonate (PC), cellulosetriacetate (CAT), cellulose acetate propionate (CAP), or a combination thereof. The substrate 1100 may also include a metallic material.

The buffer film BFL may be formed on the substrate 1100. The buffer film BFL may be formed on the substrate 1100 to protect thin-film transistors 1235 and light-emitting elements from moisture penetrating through the substrate 1100 that is vulnerable to moisture penetration. The buffer film BFL may include a plurality of inorganic films that are alternately stacked. For example, the buffer film BFL may be formed of a multi-film in which one or more inorganic films of a silicon oxide film (SiOx), a silicon nitride film (SiNx), and SiON are alternately stacked. According to some example embodiments, the buffer film may be omitted.

The thin-film transistor layer 1230 is formed on the buffer film BFL. The thin-film transistor layer 1230 includes the thin-film transistors 1235, a gate insulating film 1236, an interlayer insulating film 1237, a protective film 1238, and a planarizing film 1239.

Figure 6:
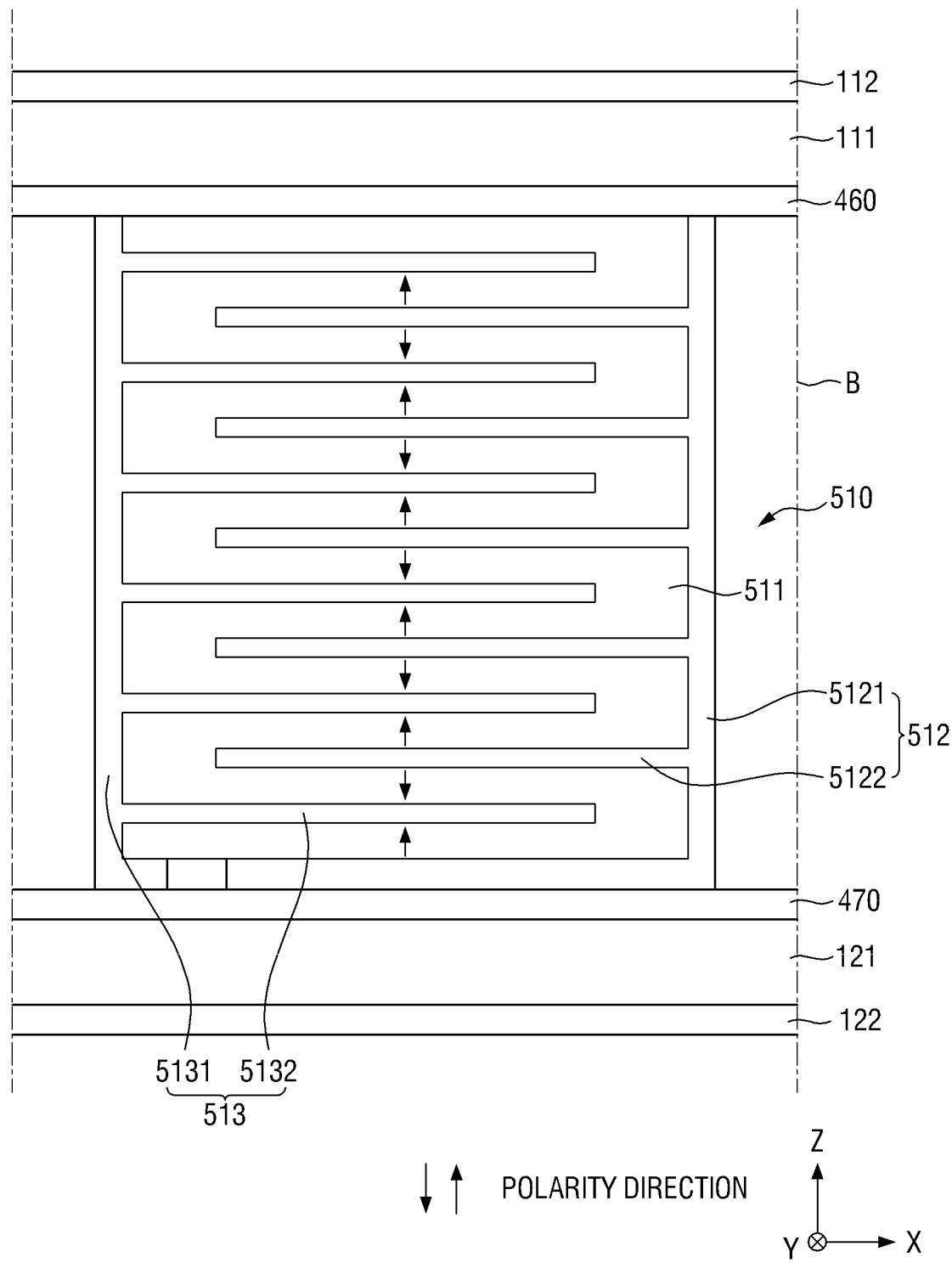
FIG. 6 is an example view illustrating an example of the sound output unit of FIG. 4.

Each of the thin-film transistors 1235 includes an active layer 1231, a gate electrode 1232, a source electrode 1233, and a drain electrode 1234. The thin-film transistors 1235 are illustrated in FIG. 6 as being formed as a top gate type in which the gate electrode 1232 is located on the active layer 1231, but the present disclosure is not limited thereto. That is, the thin-film transistors 1235 may be formed as a bottom gate type in which the gate electrode 1232 is located below the active layer 1231 or a double gate type in which the gate electrodes 1232 are located on both of upper and lower portions of the active layer 1231.

The active layer 1231 is formed on the buffer film BFL. The active layer 1231 may be formed of a silicon-based semiconductor material or an oxide-based semiconductor material. A light-blocking layer configured to block external light, which is incident on the active layer 1231, may be formed between the buffer film BFL and the active layer 1231.

The gate insulating film 1236 may be formed on the active layer 1231. The gate insulating film 1236 may be formed of an inorganic film, for example, a silicon oxide (SiOx) film, a silicon nitride (SiNx) film, or a multi-film thereof.

The gate electrode 1232 and a gate line may be formed on the gate insulating film 1236. The gate electrode 1232 and the gate line may be formed in a single layer or multilayer structure that is made of one selected from molybdenum (Mo), aluminum (Al), chromium (Cr), gold (Au), titanium (Ti), nickel (Ni), neodymium (Nd), copper (Cu), and an alloy thereof.

The interlayer insulating film 1237 may be formed on the gate electrode 1232 and the gate line. The interlayer insulating film 1237 may be formed of an inorganic film, for example, a silicon oxide (SiOx) film, a silicon nitride (SiNx) film, or a multi-film thereof.

The source electrode 1233, the drain electrode 1234, and a data line may be formed on the interlayer insulating film 1237. Each of the source electrode 1233 and the drain electrode 1234 may be connected to the active layer 1231 through contact holes that pass through the gate insulating film 1236 and the interlayer insulating film 1237. The source electrode 1233, the drain electrode 1234, and the data line may be formed in a single layer or multilayer structure that is made of one selected from molybdenum (Mo), aluminum (Al), chromium (Cr), gold (Au), titanium (Ti), nickel (Ni), neodymium (Nd), copper (Cu), and an alloy thereof.

The protective film 1238 may be formed on the source electrode 1233, the drain electrode 1234, and the data line to insulate the thin-film transistors 1235. The protective film 1238 may be formed of an inorganic film, for example, a silicon oxide (SiOx) film, a silicon nitride (SiNx) film, or a multi-film thereof.

The planarizing film 1239 may be formed on the protective film 1238 to planarize stepped portions due to the thin-film transistors 1235. The planarizing film 1239 may be formed of an organic film that is made of an acryl resin, an epoxy resin, a phenolic resin, a polyamide resin, a polyimide resin, or the like.

The light-emitting element layer 1240 is formed on the thin-film transistor layer 1230. The light-emitting element layer 1240 includes light-emitting elements and a pixel definition film 1244.

The light-emitting elements and the pixel definition film 1244 are formed on the planarizing film 1239. The light-emitting element is described as an organic light-emitting device that includes an anode electrode 1241, light-emitting layers 1242, and a cathode electrode 1243.

The anode electrode 1241 may be formed on the planarizing film 1239. The anode electrode 1241 may be connected to the source electrode 1233 of the thin-film transistor 1235 through contact holes that pass through the protective film 1238 and the planarizing film 1239.

In order to partition pixels PX, the pixel definition film 1244 may be formed to cover an edge of the anode electrode 1241 on the planarizing film 1239. That is, the pixel definition film 1244 serves as a pixel definition film that defines the pixels PX. Each of the pixels PX indicates a region in which the anode electrode 1241, the light-emitting layer 1242, and the cathode electrode 1243 are sequentially stacked and holes from the anode electrode 1241 and electrons from the cathode electrode 1243 are combined together in the light-emitting layer 1242 to emit light.

The light-emitting layers 1242 are formed on the anode electrode 1241 and the pixel definition film 1244. The light-emitting layer 1242 may be an organic light-emitting layer. The light-emitting layer 1242 may emit one of red light, green light, and blue light. Alternatively, the light-emitting layer 1242 may be a white light-emitting layer that emits white light, and in this case, the light-emitting layer 1242 may have a shape in which a red light-emitting layer, a green light-emitting layer, and a blue light-emitting layer are stacked and may be a common layer that is commonly formed in the pixels PX. In this case, the display panel 110 may further include a separate color filter for displaying red, green, and blue colors.

The light-emitting layer 1242 may include a hole transporting layer, a light-emitting layer, and an electron transporting layer. In addition, the light-emitting layer 1242 may be formed in a tandem structure of two or more stacks, and in this case, a charge generation layer may be formed between the stacks.

The cathode electrode 1243 is formed on the light-emitting layer 1242. The cathode electrode 1243 may be formed to cover the light-emitting layer 1242. The cathode electrode 1243 may be a common layer that is commonly formed in the pixels PX.

Although the light-emitting element layer 1240 has been mainly described as being formed in a top emission type in which light is emitted upward, the present disclosure is not limited thereto. The light-emitting element layer 1240 may be formed in a bottom emission type in which light is emitted downward. When the light-emitting element layer 1240 is formed in the top emission type, the anode electrode 1241 may be formed of a conductive material with high reflectivity, such as a stacked structure (Ti/Al/Ti) of aluminum and titanium, a stacked structure (ITO/Al/ITO) of aluminum and ITO, a silver-palladium-copper (APC) alloy, and a stacked structure (ITO/APC/ITO) of an APC alloy and ITO. The APC alloy is an alloy of silver (Ag), palladium (Pd), and copper (Cu). In addition, the cathode electrode 1243 may be formed of a transparent conductive material (TCO) capable of transmitting light, such as ITO or IZO or may be formed of a semi-transmissive conductive material such as magnesium (Mg), silver (Ag), or an alloy of magnesium (Mg) and silver (Ag). When the cathode electrode 1243 is formed of the semi-transmissive conductive material, light emission efficiency may be improved due to a microcavity.

The thin-film encapsulation layer 1300 is formed on the light-emitting element layer 1240. The thin-film encapsulation layer 1300 serves to prevent or reduce permeation of oxygen or moisture into the light-emitting layer 1242 and the cathode electrode 1243. To this end, the thin-film encapsulation layer 1300 may include at least one inorganic film. The inorganic film may be formed of silicon nitride, aluminum nitride, zirconium nitride, titanium nitride, hafnium nitride, tantalum nitride, silicon oxide, aluminum oxide, or titanium oxide. In addition, the thin-film encapsulation layer 1300 may further include at least one organic film. The organic film may be formed to have a sufficient thickness to prevent or reduce passing of particles through the thin-film encapsulation layer 1300 and into the light-emitting layer 1242 and the cathode electrode 1243. The organic film may include any one selected from epoxy, acrylate, and urethane acrylate.

The touch sensing unit 120 may be formed on the thin-film encapsulation layer 1300. When the touch sensing unit 120 is formed directly on the thin-film encapsulation layer 1300, a thickness of the foldable display device 1000 may be further reduced as compared to when a separate touch panel is attached on the thin-film encapsulation layer 1300. The touch sensing unit 120 may include touch electrodes for sensing a touch of a user in a capacitance manner and touch-lines for connecting pads to the touch electrodes. For example, the touch sensing unit 120 may sense the touch of the user in a self-capacitance manner or a mutual capacitance manner.

The touch electrodes of the touch sensing unit 120 may be arranged to overlap the display area DA. The touch-lines of the touch sensing unit 120 may be located in the non-display area NDA.

The lower member 200 may be located below the display module 100. The lower member 200 may include a cover panel CP, a middle frame MF, a circuit board CB, and a bottom cover BC.

The cover panel CP may include an adhesive member, a buffer member, a heat dissipation member, and a light-blocking member.

The adhesive member may be attached to the lower surface of the display module 100. The buffer member may absorb an external impact to prevent or reduce damage to the display panel 110. The buffer member may be formed of a single layer or a plurality of layers. For example, the buffer member may be made of a polymer resin such as polyurethane, polycarbonate, polypropylene, or polyethylene or may be made of a material having elasticity, such as a sponge formed by foam-molding rubber, a urethane-based material, or an acrylic-based material. The buffer member may be a cushion layer.

The heat dissipation member may include a first heat dissipation layer containing graphite, carbon nanotubes, or the like and a second heat dissipation layer formed of a thin film of a metal such as copper, nickel, ferrite, or silver, which is capable of shielding an electromagnetic wave and has high thermal conductivity.

The light-blocking member serves to prevent or reduce visual recognition of the sound output unit 510, the vibration output unit 520, the fixing part 530, and the like, which are located on a lower surface of the substrate 1100, by the user in the display area DA of the display panel 110 by preventing or reducing transmission of light. The light-blocking member may include a light absorption material such as a black pigment or a dye.

The middle frame MF may be located below the cover panel CP. The middle frame MF may include plastic, metal, or both plastic and metal. A camera hole into which a camera device is inserted, a battery hole in which a battery is located, and the like may be formed in the middle frame MF.

The circuit board CB and the battery may be located below the middle frame MF. The circuit board CB may be a printed circuit board or a flexible printed circuit board.

The circuit board CB may include a main processor, a camera device, a motion detection sensor, and the like.

The main processor may control all functions of the foldable display device 1000. For example, the main processor may output digital video data to a display driving circuit through a display circuit board such that the display panel 110 displays an image. In addition, the main processor may receive touch data from a touch driving circuit, determine touch coordinates of a user, and then execute an application indicated by an icon that is displayed on the touch coordinates of the user.

The camera device processes an image frame of a still image, a moving image, or the like, which is obtained by an image sensor in a camera mode, and outputs the image frame to the main processor.

The motion detection sensor is a component for detecting the motion of a main body of the foldable display device 1000. That is, the foldable display device 1000 may be folded and unfolded, or may be rotated or tilted in various directions. The motion detection sensor may detect movement characteristics such as a rotation direction, an angle, and a tilt using at least one of various sensors such as a geomagnetic sensor, a gyro sensor, or an acceleration sensor.

The battery may be arranged such that it does not overlap the circuit board CB in the third direction DR3. The battery may overlap the battery hole of the middle frame MF.

In addition, the circuit board CB may be further equipped with a mobile communication module capable of transmitting and receiving a wireless signal to and from at least one of a base station, an external terminal, or a server on a mobile communication network. The wireless signal may include various forms of data associated with transmission and reception of voice signals, video call signals, or text/multimedia messages.

The bottom cover BC may be located below the circuit board CB and the battery. The bottom cover BC may be coupled and fixed to the middle frame MF. The bottom cover BC may form a lower exterior of the foldable display device 1000. A camera hole through which a lower surface of the camera device is exposed may be formed in the bottom cover BC. The bottom cover BC may include plastic, metal, or both plastic and metal.

In the display module 100, a first non-folded area NFA1 and a second non-folded area NFA2 may be located on one side and the other side with respect to the folded area FA, respectively.

Figure 8:
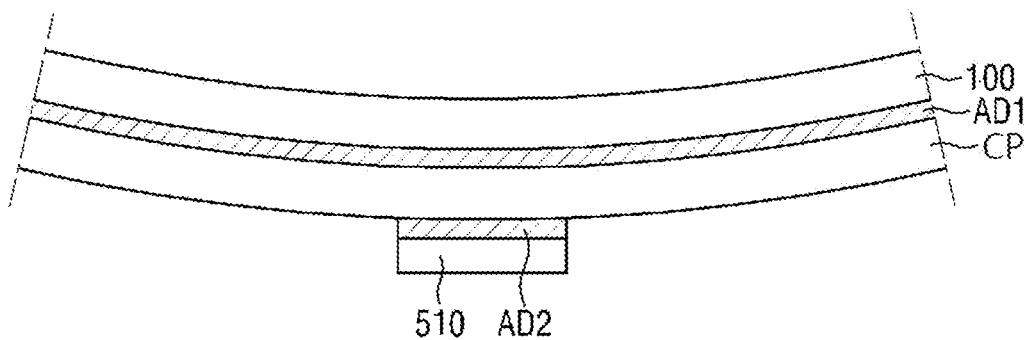
FIGS. 8 and 9 are example views illustrating a method of vibrating the display panel through vibrations of the sound output unit according to some example embodiments of the present disclosure.
Figure 9:
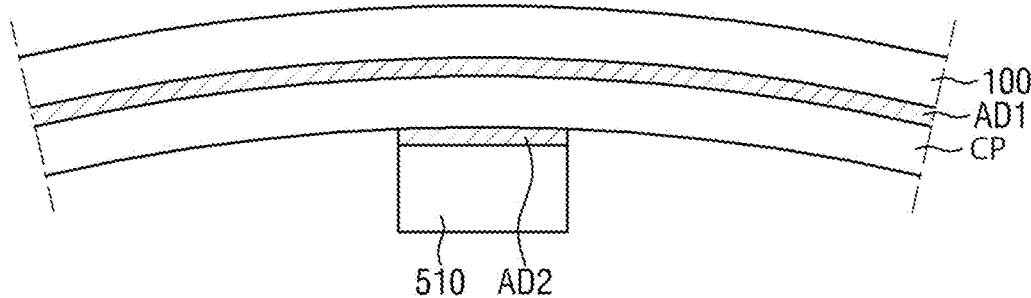

According to some example embodiments, the first non-folded area NFA1 may include a first sound output unit 510A, a first vibration output unit 520A, and a first fixing part 530A. The first sound output unit 510A and the first vibration output unit 520A may be directly attached to the lower surface of the display module 100 by an adhesive member such as a pressure-sensitive adhesive. For example, the first sound output unit 510A may be attached to the lower surface of the display module 100 by a first adhesive member PSA1. That is, the first sound output unit 510A and the first vibration output unit 520A may be arranged such that it does not overlap the cover panel CP, which is located on the lower surface of the display module 100, in the third direction DR3. However, the present disclosure is not limited thereto, and as illustrated in FIGS. 8 and 9, the first sound output unit 510A and the first vibration output unit 520A may be located on the cover panel CP to overlap the cover panel CP in the third direction DR3.

The first sound output unit 510A may be arranged to be adjacent to an upper side of the display module 100, and the first vibration output unit 520A may be arranged to be adjacent to a lower side of the display module 100. However, the position of the first sound output unit 510A and the position of the first vibration output unit 520A are not limited to those illustrated in FIG. 3.

The first sound output unit 510A may include a receiver configured to output a voice of the other party in a call mode or a speaker configured to output music in a multimedia playback mode. When it is in a haptic mode, the first vibration output unit 520A may generate various vibrations that may be felt by the user. The intensity and pattern of the generated vibration may be controlled by the selection of the user or the setting of the main processor. For example, different vibrations may be combined with each other and output, or may be sequentially output.

However, the first vibration output unit 520A may include a speaker that not only generates vibration but also outputs music in a multimedia playback mode.

Figure 7:
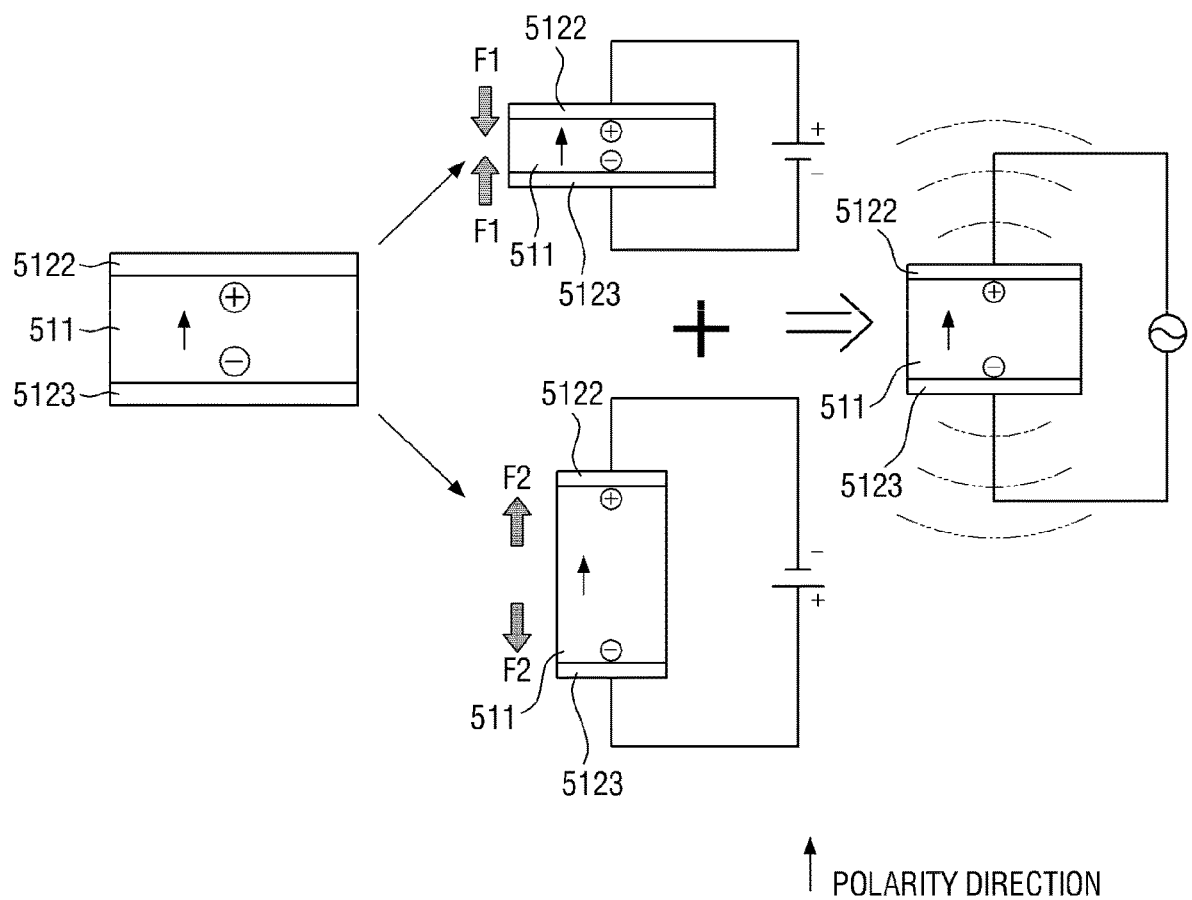
FIG. 7 is an example view illustrating a vibration method of a vibration layer that is between a first branch electrode and a second branch electrode of the sound output unit of FIG. 6.

The first fixing part 530A may be located to overlap the first sound output unit 510A in the third direction DR3. In addition, the first fixing part 530A may be spaced apart (e.g., by a set or predetermined distance) from the first sound output unit 510A in the third direction DR3. This is because, as shown in FIGS. 7 to 9, the first sound output unit 510A is a device that generates sound by vibrating the display module 100 up and down, so that one side surface of the first sound output unit 510A is fixed to the display module 100 but the other side surface of the first sound output unit 510A, which is a surface opposite to the one side surface, may not be fixed.

The first fixing part 530A may be arranged to not overlap the middle frame MF and the circuit board CB in the third direction DR3 and may be located to overlap the bottom cover BC in the third direction DR3. That is, the first fixing part 530A may be located in a space occupied by the middle frame MF and the circuit board CB in the third direction DR3. For example, one surface of the first fixing part 530A may be attached to the bottom cover BC by a second adhesive member PSA2. In addition, the other surface of the first fixing part 530A may be attached to the middle frame MF by a third adhesive member PSA3.

The first fixing part 530A may be made of a magnetic material and may be arranged to be detachable from a second vibration output unit 520B to be described later. According to some example embodiments, the first fixing part 530A may include a magnetic material. For example, the magnetic material may include a permanent magnet. In this case, the magnetic material may always maintain a magnetic force. The second vibration output unit 520B may include a magnetic material. Accordingly, when the foldable display device 1000 is folded, an attractive force due to a magnetic force may act between the first fixing part 530A and the second vibration output unit 520B.

The second non-folded area NFA2 may include a second sound output unit 510B, the second vibration output unit 520B, and a second fixing part 530B. The second sound output unit 510B and the second vibration output unit 520B may be attached to the lower surface of the display module 100 by an adhesive member such as a pressure-sensitive adhesive. For example, the second sound output unit 510B may be attached to the lower surface of the display module 100 by a fourth adhesive member PSA4. That is, the second sound output unit 510B and the second vibration output unit 520B may be arranged such that it does not overlap the cover panel CP, which is located on the lower surface of the display module 100, in the third direction DR3. However, the present disclosure is not limited thereto, and as illustrated in FIGS. 8 and 9, the second sound output unit 510B and the second vibration output unit 520B may be located on the cover panel CP to overlap the cover panel CP in the third direction DR3.

The second sound output unit 510B may be arranged to be adjacent to the lower side of the display module 100, and the second vibration output unit 520B may arranged to be adjacent to the upper side of the display module 100.

The first sound output unit 510A and the first fixing part 530A, and the second vibration output unit 520B may be symmetrical with respect to the folding axis FX, such that the first sound output unit 510A and the first fixing part 530A overlap the second vibration output unit 520B in the third direction DR3 when the display module 100 is folded. In addition, the second sound output unit 510B and the second fixing part 530B, and the first vibration output unit 520A may be symmetrical with respect to the folding axis FX, such that the second sound output unit 510B and the second fixing part 530B overlap the first vibration output unit 520A in the third direction DR3 when the display module 100 is folded.

The second vibration output unit 520B may be arranged to not overlap the cover panel CP, the middle frame MF, and the circuit board CB in the third direction DR3, and may be located to overlap the bottom cover BC in the third direction DR3. That is, the second vibration output unit 520B may be located in a space occupied by the cover panel CP, the middle frame MF, and the circuit board CB in the third direction DR3. For example, one surface of the second vibration output unit 520B may be attached to the lower surface of the display module 100 by the fourth adhesive member PSA4, and the other surface of the second vibration output unit 520B may be attached to the bottom cover BC by a fifth adhesive member PSA5.

The functions of the second sound output unit 510B, the second vibration output unit 520B, and the second fixing part 530B are the same as those of the first sound output unit 510A, the first vibration output unit 520A, and the first fixing part 530A, and the arrangement form between the second sound output unit 510B and the second fixing part 530B is the same as the arrangement form between the first sound output unit 510A and the first fixing part 530A, and thus detailed descriptions thereof will be omitted.

Hereinafter, more detailed structures of the sound output units 510A and 510B and the vibration output units 520A and 520B will be described with reference to FIGS. 6 to 10.

Figure 10:
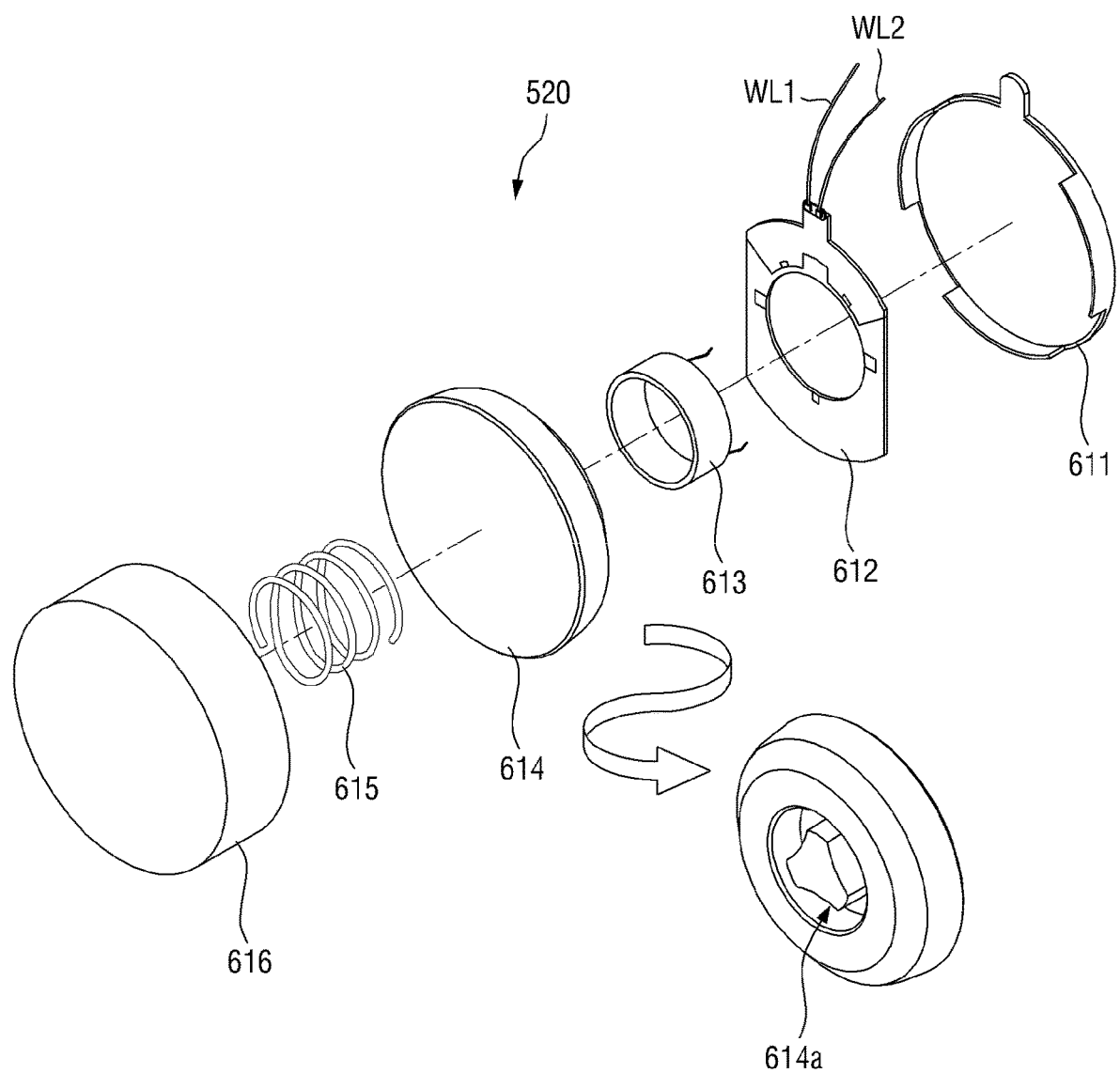
FIG. 10 is an example view illustrating an example of the vibration output unit of FIG. 4.

FIG. 6 is an example view illustrating an example of the sound output unit of FIG. 4. FIG. 7 is an example view illustrating a vibration method of a vibration layer that is located between a first branch electrode and a second branch electrode of the sound output unit of FIG. 6. FIGS. 8 and 9 are example views illustrating a method of vibrating the display panel through vibrations of the sound output unit. FIG. 10 is an example view illustrating an example of the vibration output unit of FIG. 4.

Referring to FIGS. 6 to 9, each of the first and second sound output units 510A and 510B may include a piezoelectric element or piezoelectric actuator that vibrates the display module 100 using a piezoelectric material that contracts or expands according to an applied driving voltage. Each of the first and second sound output units 510A and 510B may include a vibration layer 511, a first electrode 512, and a second electrode 513.

The first electrode 512 may include a first stem electrode 5121 and first branch electrodes 5122. The first stem electrode 5121 may be located on only one side surface of the vibration layer 511 or may be located on a plurality of side surfaces of the vibration layer 511 as shown in FIG. 6. The first stem electrode 5121 may also be located on an upper surface of the vibration layer 511. The first branch electrodes 5122 may be branched from the first stem electrode 5121. The first branch electrodes 5122 may be arranged in parallel to each other.

The second electrode 513 may include a second stem electrode 5131 and second branch electrodes 5132. The second stem electrode 5131 may be located on another side surface of the vibration layer 511 or may also be located on the plurality of side surfaces of the vibration layer 511 as shown in FIG. 6. Here, as shown in FIG. 6, the first stem electrode 5121 may be located on either side surface of the plurality of side surfaces on which the second stem electrode 5131 is located. The second stem electrode 5131 may be located on the upper surface of the vibration layer 511. The first stem electrode 5121 and the second stem electrode 5131 may not overlap each other. The second branch electrodes 5132 may be branched from the second stem electrode 5131. The second branch electrodes 5132 may be arranged in parallel to each other.

The first branch electrodes 5122 and the second branch electrodes 5132 may be arranged in parallel to each other in a horizontal direction (X-axis direction or Y-axis direction). In addition, the first branch electrodes 5122 and the second branch electrodes 5132 may be alternately arranged in a vertical direction (Z-axis direction). That is, the first branch electrodes 5122 and the second branch electrodes 5132 may be arranged in such a manner that the first branch electrode 5122, the second branch electrode 5132, the first branch electrode 5122, and the second branch electrode 5132 are sequentially and repeatedly arranged in the vertical direction (Z-axis direction).

The vibration layer 511 may include a piezoelectric element that is deformed according to a first driving voltage applied to the first electrode 512 and a second driving voltage applied to the second electrode 513. In this case, the vibration layer 511 may include one or more of a poly vinylidene fluoride (PVDF) film, a piezoelectric material such as plumbum zirconate titanate (PZT), and an electro-active polymer.

The vibration layer 511 may be located between the first branch electrodes 5122 and the second branch electrodes 5132. A manufacturing temperature of the vibration layer 511 is high, so that the first electrode 512 and the second electrode 513 may be made of silver (Ag) with a high melting point or an alloy of silver (Ag) and palladium (Pd). When the first electrode 512 and the second electrode 513 are made of an alloy of silver (Ag) and palladium (Pd) to increase a melting point of the first electrode 512 and the second electrode 513, a content of silver (Ag) may be higher than a content of palladium (Pd).

The first electrode 512 and the second electrode 513 may be connected to a sound circuit board to receive driving voltages from the sound circuit board. The vibration layer 511 contracts or expands according to a difference between the first driving voltage, which is applied to the first branch electrodes 5122 of the first electrode 512, and the second driving voltage that is applied to the second branch electrodes 5132 of the second electrode 513.

For example, as shown in FIG. 7, when a polarity direction of the vibration layer 511, which is located between the first branch electrode 5122 and the second branch electrode 5132 located below the first branch electrode 5122, is an upward direction (↑), the vibration layer 511 may have a positive polarity in an upper region thereof, which is adjacent to the first branch electrode 5122, and may have a negative polarity in a lower region thereof, which is adjacent to the second branch electrode 5132. In addition, as shown in FIG. 7, when a polarity direction of the vibration layer 511, which is located between the second branch electrode 5132 and the first branch electrode 5122 located below the second branch electrode 5132, is a downward direction (↓), the vibration layer 511 may have a negative polarity in an upper region thereof, which is adjacent to the second branch electrode 5132, and may have a positive polarity in a lower region thereof, which is adjacent to the first branch electrode 5122. The polarity direction of the vibration layer 511 may be determined in a poling process, in which an electric field is applied to the vibration layer 511 using the first branch electrode 5122 and the second branch electrode 5132.

As shown in FIG. 7, when the polarity direction of the vibration layer 511, which is located between the first branch electrode 5122 and the second branch electrode 5132 located below the first branch electrode 5122, is an upward direction (↑), the first driving voltage with a positive polarity may be applied to the first branch electrode 5122, and the second driving voltage with a negative polarity may be applied to the second branch electrode 5132, and in this case, the vibration layer 511 may contract by a first force F1. The first force F1 may be a contraction force. In addition, when the first driving voltage with a negative polarity is applied to the first branch electrode 5122, and the second driving voltage with a positive polarity is applied to the second branch electrode 5132, the vibration layer 511 may expand by a second force F2. The second force F2 may be an extension force.

Similarly, when the polarity direction of the vibration layer 511, which is located between the second branch electrode 5132 and the first branch electrode 5122 located below the second branch electrode 5132, is a downward direction (↓), the first driving voltage with a positive polarity may be applied to the second branch electrode 5132, and the second driving voltage with a negative polarity may be applied to the first branch electrode 5122, and in this case, the vibration layer 511 may expand by an extension force. In addition, when the first driving voltage with a negative polarity is applied to the second branch electrode 5132, and the second driving voltage with a positive polarity is applied to the first branch electrode 5122, the vibration layer 511 may contract by a contraction force. The second force F2 may be a contraction force.

As shown in FIG. 7, when the first driving voltage applied to the first electrode 512 and the second driving voltage applied to the second electrode 513 are alternately repeated between a positive polarity and a negative polarity, the vibration layer 511 repeatedly contracts and expands. As a result, the first and second sound output units 510A and 510B vibrate.

In addition, because the first and second sound output units 510A and 510B are located on the lower surface of the display module 100, when the vibration layer 511 of the first and second sound output units 510A and 510B contracts and expands, the display module 100 vibrates upward and downward by stress as shown in FIGS. 8 and 9. As described above, the display module 100 may vibrate by the first and second sound output units 510A and 510B, so that the foldable display device 1000 may output sound. According to some example embodiments, the cover panel CP may be attached to the lower surface of the display module 100 by a first adhesive layer AD1, and the first and second sound output units 510A and 510B may be attached to a lower surface of the cover panel CP by a second adhesive layer AD2.

FIG. 10 is an example view illustrating an example of the vibration output unit of FIG. 4. FIG. 10 illustrates an example in which each of the first and second vibration output units 520A and 520B includes a linear resonant actuator LRA.

Referring to FIG. 10, each of the first and second vibration output units 520A and 520B may include a lower chassis 611, a flexible circuit board 612, a voice coil 613, a magnet 614, a spring 615, and an upper chassis 616. The lower chassis 611 and the upper chassis 616 may be formed of a metallic material. The flexible circuit board 612 is located on one surface of the lower chassis 611, which faces the upper chassis 616, and is connected to a first sound wire WL1 and a second sound wire WL2. The voice coil 613 may be connected to one surface of the flexible circuit board 612, which faces the upper chassis 616. Accordingly, one end of the voice coil 613 may be electrically connected to the first sound wire WL1, and the other end thereof may be electrically connected to the second sound wire WL2. The magnet 614 may include a permanent magnet, and a voice coil groove 641, in which the voice coil 613 is accommodated, may be formed on one surface of the magnet 614, which faces the voice coil 613. The spring 615 is located between the magnet 614 and the upper chassis 616.

The direction of a current, which flows through the voice coil 613 of each of the first and second vibration output units 520A and 520B, may be controlled according to the first driving voltage applied to the first sound wire WL1 and the second driving voltage applied to the second sound wire WL2. An applied magnetic field may be formed around the voice coil 613 according to the current flowing through the voice coil 613. That is, the direction of the current, which flows through the voice coil 613 when the first driving voltage is a positive voltage and the second driving voltage is a negative voltage, is opposite to the direction of the current that flows through the voice coil 613 when the first driving voltage is a negative voltage and the second driving voltage is a positive voltage. An attractive force and a repulsive force may alternately act between the magnet 614 and the voice coil 613 by alternating-current driving the first driving voltage and the second driving voltage. Thus, the magnet 614 may reciprocate between the voice coil 613 and the upper chassis 616 by the spring 615. Accordingly, the display panel 110 located on the upper chassis 616 may vibrate to output a first sound.

As shown in FIG. 10, when each of the first and second vibration output units 520A and 520B includes the linear resonant actuator LRA, the first and second vibration output units 520A and 520B may be attached on only a second surface of a display module 100, and a gap may present between each of the first and second vibration output units 520A and 520B and a second surface of a lower member 200. In this case, the first and second vibration output units 520A and 520B may not vibrate a lower member 200 but may vibrate the display module 100 to output the first sound.

Figure 11:
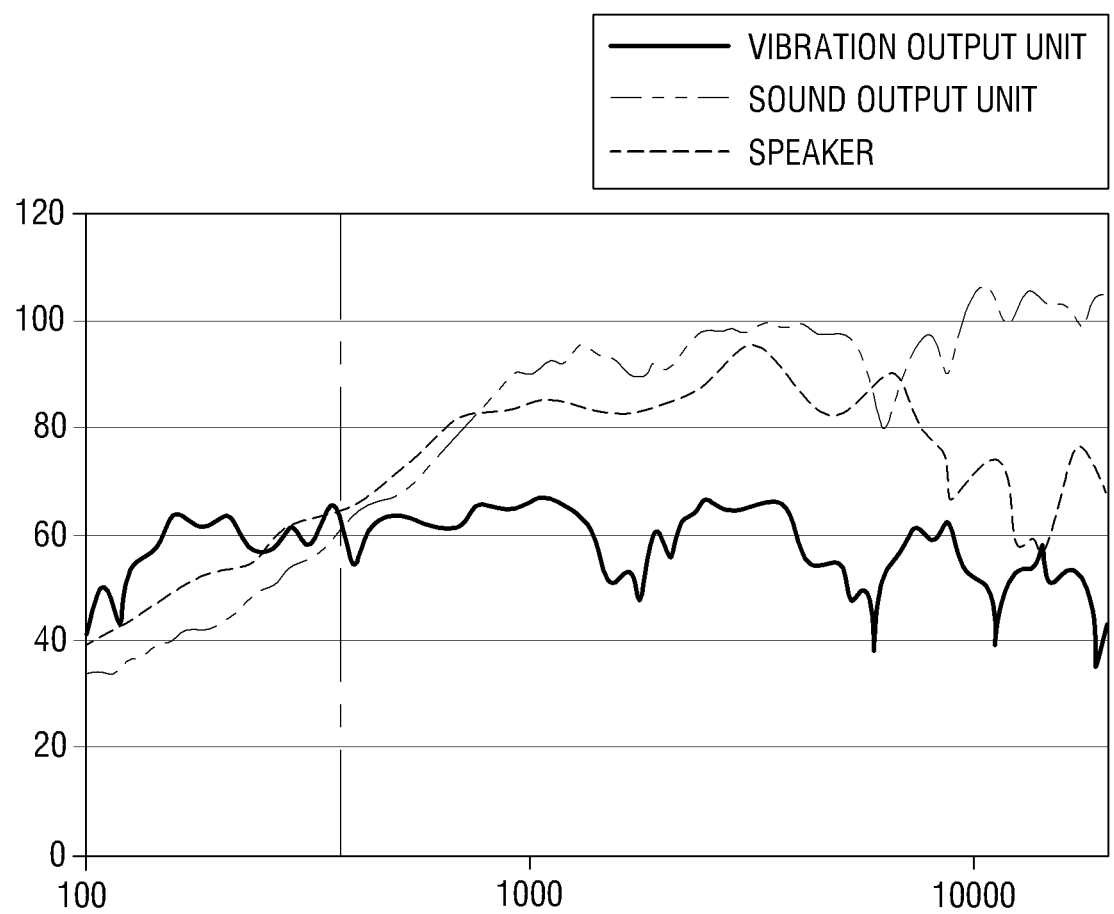
FIG. 11 is a graph illustrating intensities of sound pressures of the sound output unit and the vibration output unit according to a frequency band according to some example embodiments of the present disclosure.

FIG. 11 is a graph illustrating intensities of sound pressures of the sound output unit and the vibration output unit according to a frequency band.

Referring to FIG. 11, a two-point dashed line indicates the intensity of sound pressure of the sound output unit 510 according to the frequency, a solid line indicates the intensity of sound pressure of the vibration output unit 520 according to the frequency, and a dotted line indicates the intensity of sound pressure of a normal speaker according to the frequency. Here, the unit of the frequency is "Hz" and the unit of the intensity of sound pressure is "dB".

It may be seen that, in a low-frequency band having a frequency of 1000 Hz or less, particularly a frequency of about 600 HZ or less, the intensity of sound pressure of the sound output unit 510 is generally lower than that of the normal speaker, and the intensity of sound pressure of the vibration output unit 520 is generally greater than that of the normal speaker.

On the other hand, it may be seen that, in a mid-to-high frequency band having a frequency of 1000 Hz or more, the intensity of sound pressure of the sound output unit 510 is generally greater than that of the normal speaker, and the intensity of sound pressure of the vibration output unit 520 is generally lower than that of the normal speaker.

Thus, when the vibration output unit 520 is used together with the sound output unit 510, the low-intensity sound in the low-frequency band may be complemented. That is, the sound output unit 510 may serve as a sound generation device for a mid-to-high frequency sound for outputting sound of a mid-to-high frequency band, and the vibration output unit 520 may serve as a sound generation device for a low-frequency sound for outputting sound of a low-frequency band. The sound of the low-frequency band may refer to sound of a low-frequency band having a frequency of 1000 Hz or less, and the sound of the mid-to-high frequency band may refer to sound of a high frequency band having a frequency greater than 1000 Hz. However, the example embodiments of the present specification are not limited thereto. In addition, when the sound of the low-frequency band is sound of a low-frequency band having a frequency of 1000 Hz or less, the sound of the low-frequency band may include both the low-frequency sound and a middle-frequency sound.

Figure 12:
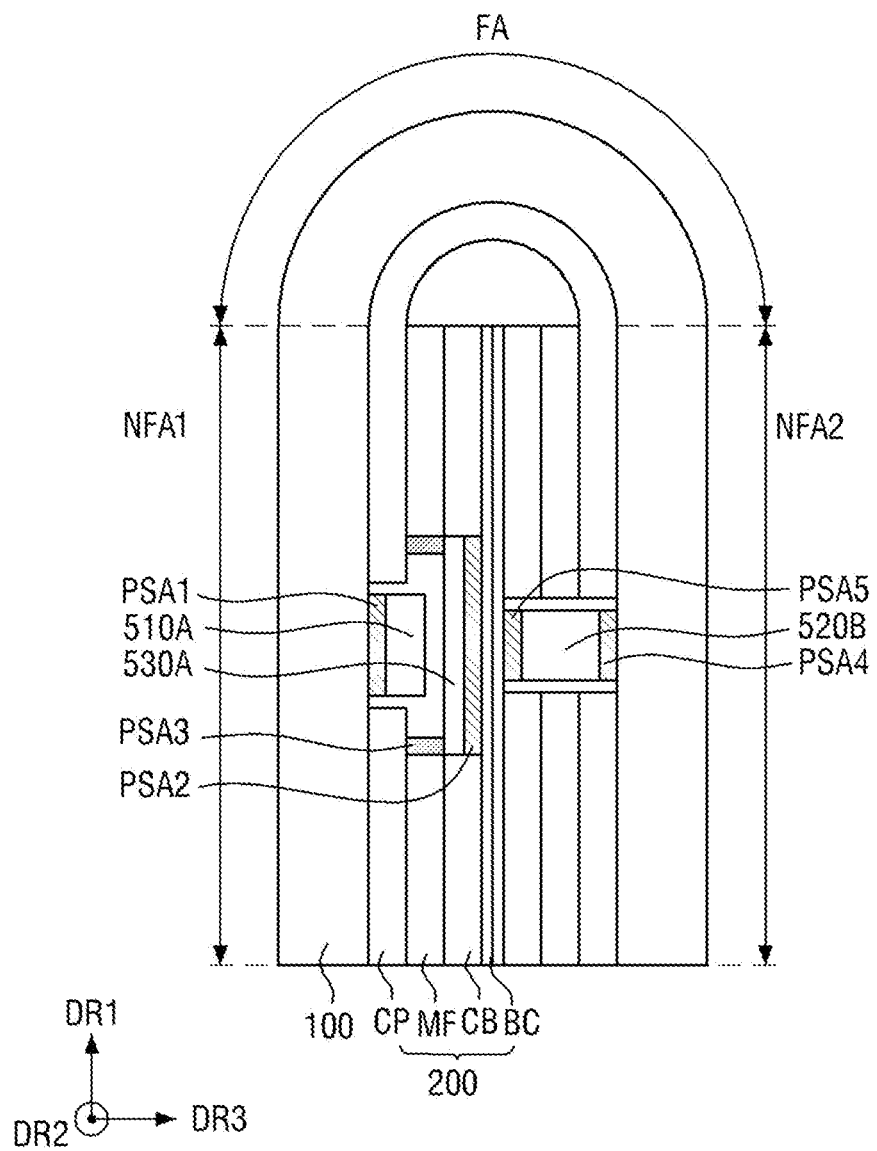
FIG. 12 is a cross-sectional view illustrating a folded state of the display panel of FIGS. 4 and 5.
Figure 13:
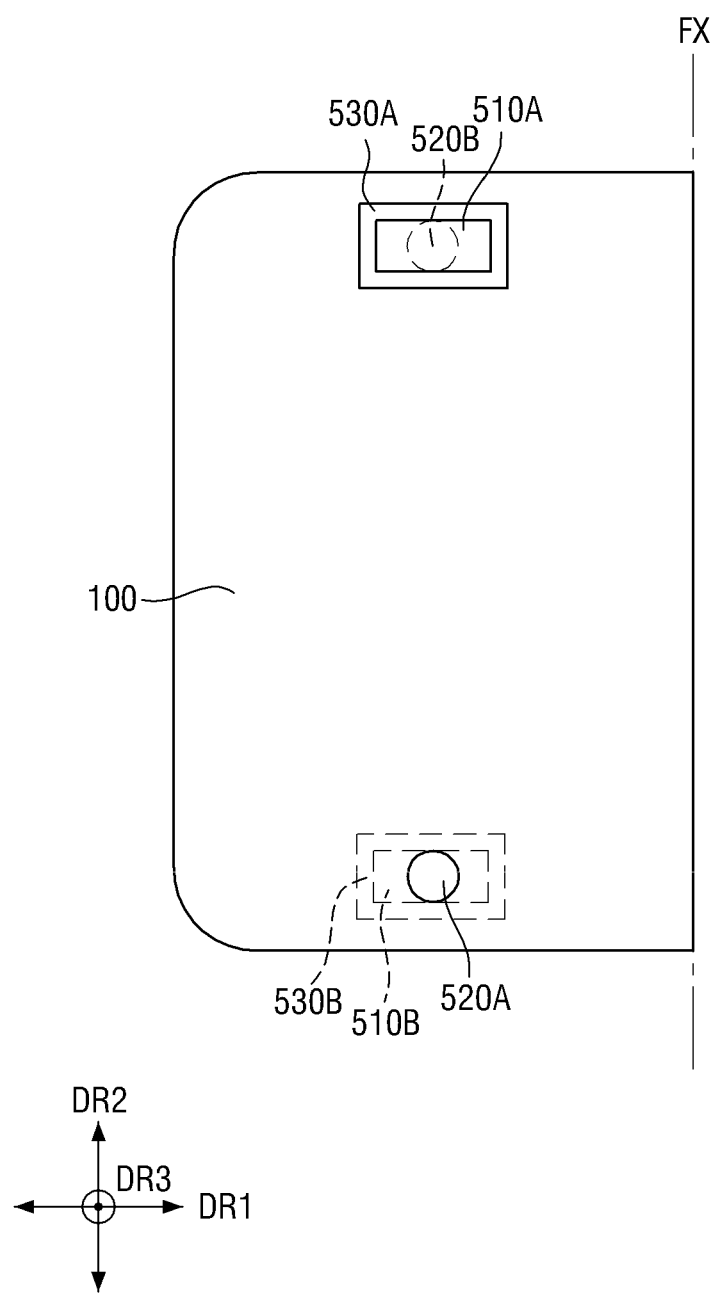
FIGS. 13 and 14 are plan views illustrating the folded state of the display panel of FIG. 4.
Figure 14:
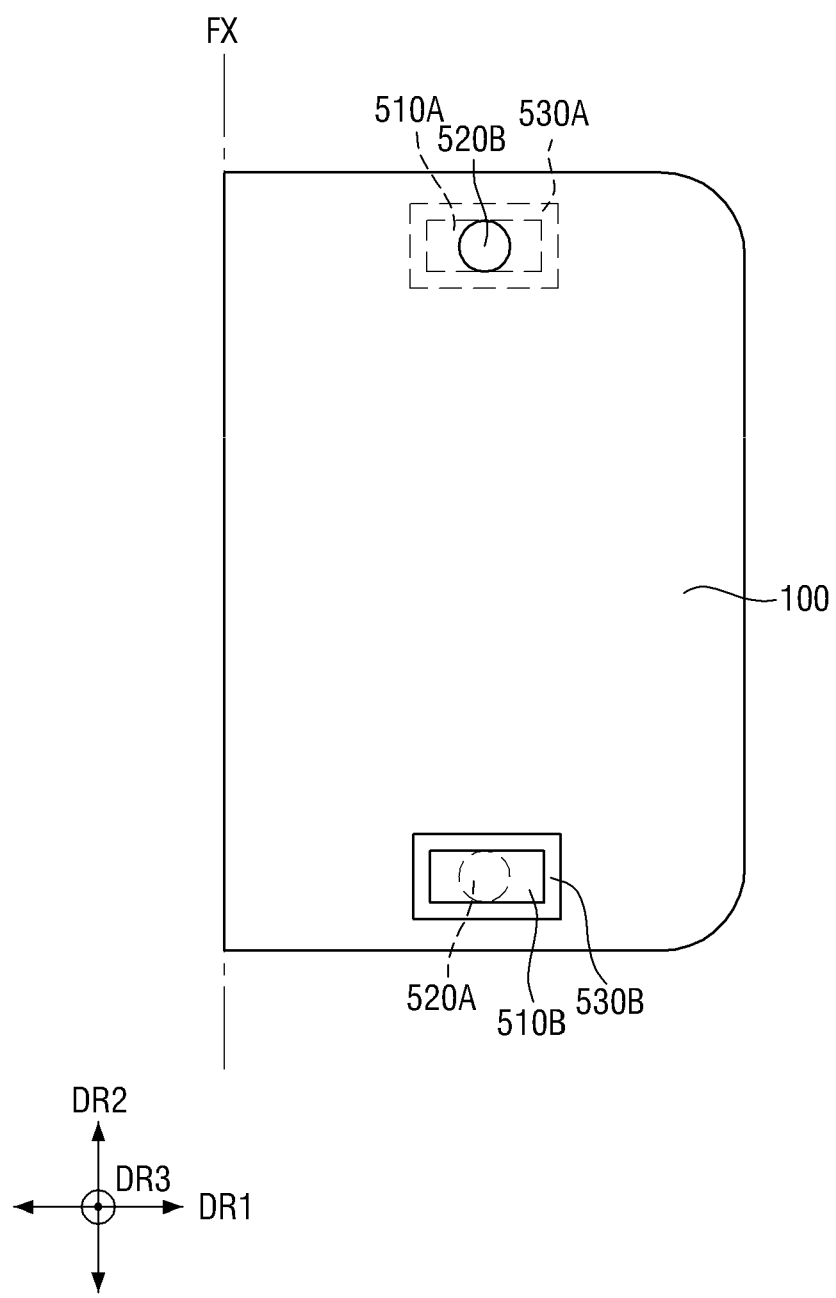

FIG. 12 is a cross-sectional view illustrating a folded state of the display panel of FIGS. 4 and 5. FIGS. 13 and 14 are plan views illustrating the folded state of the display panel of FIG. 4.

Referring to FIGS. 12 to 14, when the display module 100 is folded, the first non-folded area NFA1 and the second non-folded area NFA2 may be arranged to overlap each other in the third direction DR3.

In this case, the first sound output unit 510A and the first fixing part 530A are arranged to overlap the second vibration output unit 520B in the third direction DR3, and the second sound output unit 510B and the second fixing part 530B may be arranged to overlap the first vibration output unit 520A in the third direction DR3.

As described above, the first fixing part 530A may be made of a magnetic material and may be configured to be detachable from the second vibration output unit 520B. According to some example embodiments, the first fixing part 530A may include a magnetic material. The second vibration output unit 520B may include a magnetic material. That is, the second vibration output unit 520B may include the magnet 614. Accordingly, when the foldable display device 1000 is folded around the folding axis FX, an attractive force due to a magnetic force may act between the magnet 614 of the second vibration output unit 520B and the first fixing part 530A.

The second fixing part 530B may be made of a magnetic material and may be configured to be detachable from the first vibration output unit 520A. The first vibration output unit 520A may include a magnetic material. That is, the first vibration output unit 520A may include the magnet 614. Accordingly, when the foldable display device 1000 is folded around the folding axis FX, an attractive force due to a magnetic force may act between the magnet 614 of the first vibration output unit 520A and the second fixing part 530B.

Thus, when the foldable display device 1000 is folded, an attractive force due to a magnetic force may act between the first non-folded area NFA1 and the second non-folded area NFA2 so that the folded state of the foldable display device 1000 may be maintained.

Figure 15:
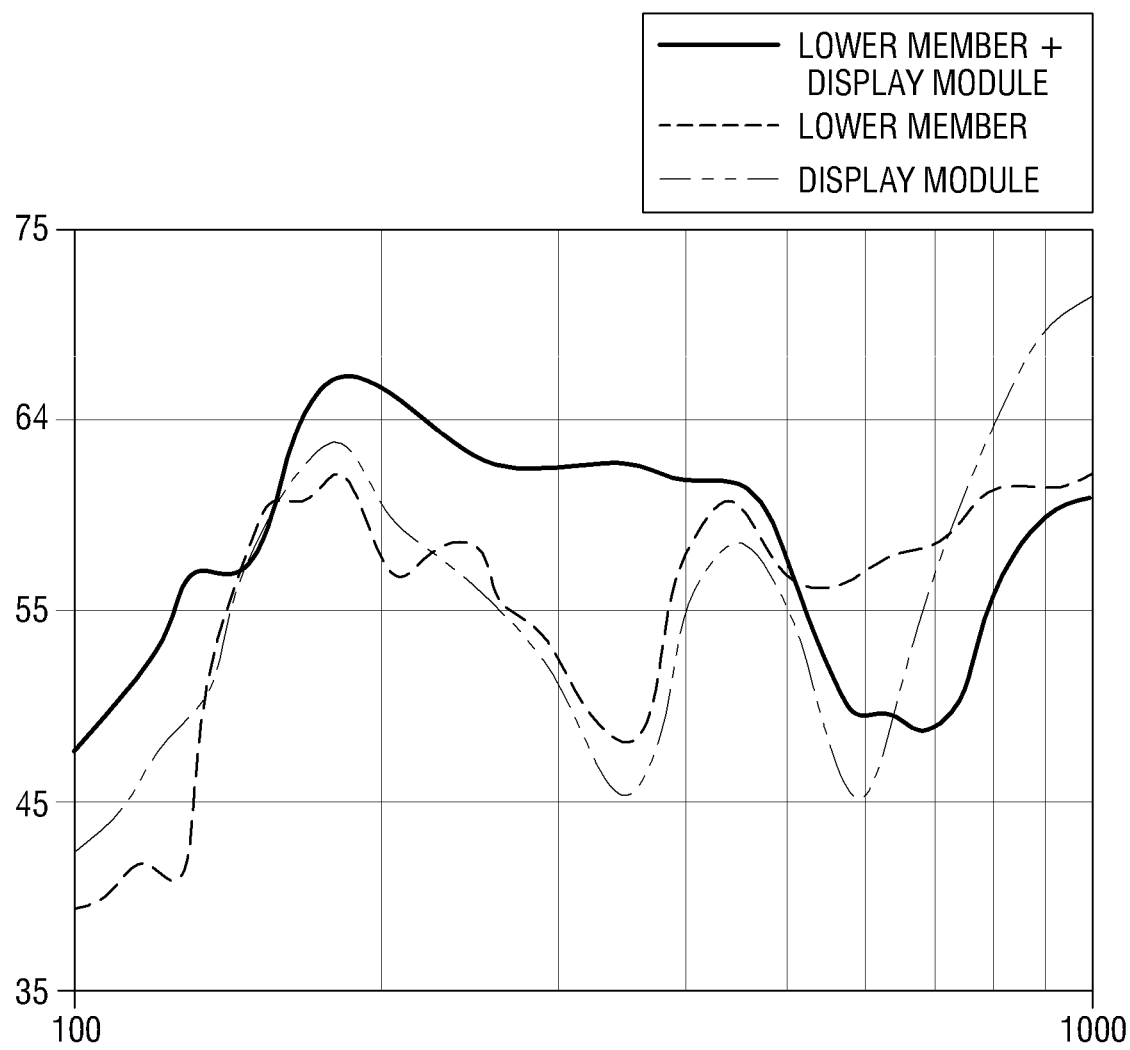
FIG. 15 is a graph illustrating the intensities of sound pressure of the vibration output unit according to a frequency band in a state in which the vibration output unit is configured according to some example embodiments of the present disclosure.
Figure 16:
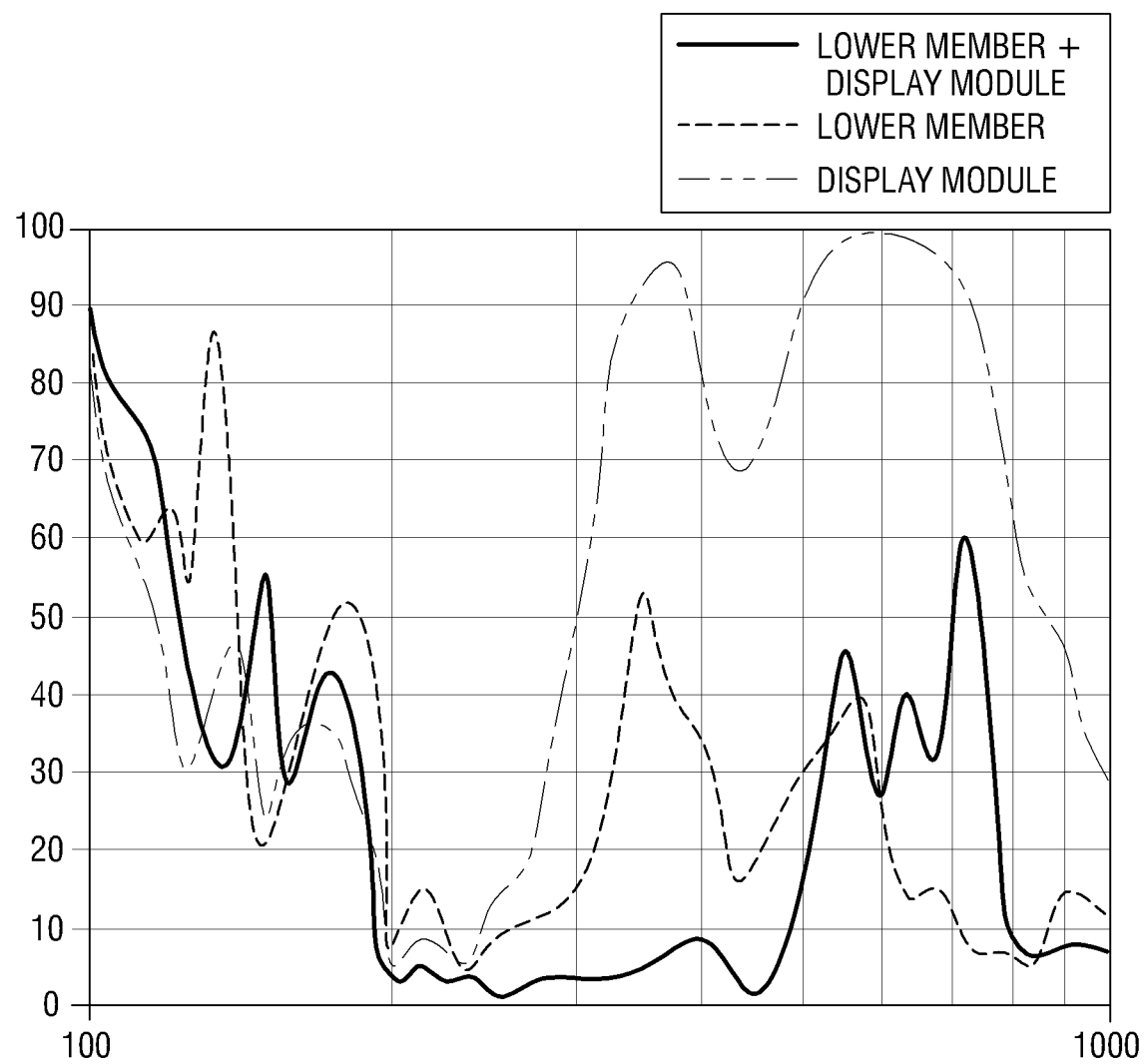
FIG. 16 is a graph illustrating the degree of distortion in the vibration output unit according to the frequency band in the state in which the vibration output unit is configured according to some example embodiments of the present disclosure.

FIG. 15 is a graph illustrating the intensity of sound pressure of the vibration output unit according to a frequency band in a state in which the vibration output unit is located. FIG. 16 is a graph illustrating the degree of distortion in the vibration output unit according to the frequency band in the state in which the vibration output unit is located.

In FIG. 15, a solid line indicates the intensity of sound pressure of the vibration output unit 520 according to the frequency band when the vibration output unit 520 is coupled to both the display module 100 and the lower member 200, a dotted line indicates the intensity of sound pressure of the vibration output unit 520 according to the frequency band when the vibration output unit 520 is coupled only to the lower member 200, and a two-point dashed line indicates the intensity of sound pressure of the vibration output unit 520 according to the frequency band when the vibration output unit 520 is coupled only to the display module 100. Here, the unit of the frequency is "Hz" and the unit of the intensity of sound pressure is "dB".

In FIG. 16, a solid line indicates the degree of distortion in the vibration output unit 520 according to the frequency band when the vibration output unit 520 is coupled to both the display module 100 and the lower member 200, a dotted line indicates the degree of distortion in the vibration output unit 520 according to the frequency band when the vibration output unit 520 is coupled only to the lower member 200, and a two-point dashed line indicates the degree of distortion in the vibration output unit 520 according to the frequency band when the vibration output unit 520 is coupled only to the display module 100. Here, the unit of frequency is "Hz", and the degree of distortion is represented by a "relative value (%)".

Referring to the frequency band of about 400 Hz in FIG. 16, it may be seen that the degree of distortion is great in the order of when the vibration output unit 520 is coupled only to the display module 100, when the vibration output unit 520 is coupled only to the lower member 200, and when the vibration output unit 520 is coupled to both the display module 100 and the lower member 200.

On the other hand, referring to the frequency band of about 400 Hz in FIG. 15, it may be seen that the intensity of sound pressure is great in the reverse order of when the vibration output unit 520 is coupled only to the display module 100, when the vibration output unit 520 is coupled only to the lower member 200, and when the vibration output unit 520 is coupled to both the display module 100 and the lower member 200.

That is, when the lowest distortion is generated in the frequency band of about 400 Hz, that is, when the vibration output unit 520 is coupled to both the display module 100 and the lower member 200, the sound pressure may have the greatest intensity. In other words, the better the degree to which the vibration output unit 520 is coupled to an external structure, the better the sound may be output.

Accordingly, when the display module 100 is folded, the first vibration output unit 520A is arranged to overlap the second fixing part 530B in the third direction DR3, and the second vibration output unit 520B is arranged to overlap the first fixing part 530A in the third direction DR3, and thus the vibration output unit 520 may output better sound due to an attractive force caused by a magnetic force between the vibration output unit 520 and the fixing part 530.

Figure 17:
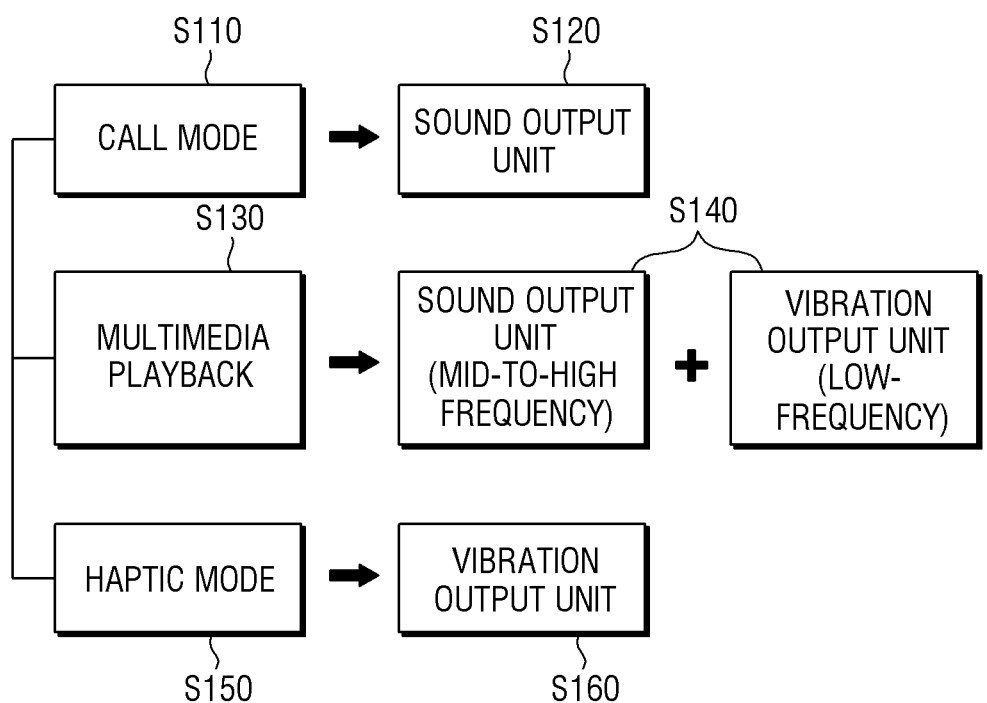
FIG. 17 is a diagram illustrating an operation algorithm of the sound output unit and the vibration output unit according to an operation mode of the display device according to some example embodiments of the present disclosure.

FIG. 17 is a diagram illustrating an operation algorithm of the sound output unit and the vibration output unit according to an operation mode of the display device.

Referring to FIG. 17, the main processor may control operating states of the sound output unit 510 and the vibration output unit 520 for each operation mode of the foldable display device 1000.

According to some example embodiments, when the foldable display device 1000 is in a call mode (S110), the main processor may operate the sound output unit 510 to be used as a receiver (S120). However, embodiments according to the present disclosure are not limited thereto, and the main processor may operate the vibration output unit 520 together with the sound output unit 510 to be used as a receiver.

When the foldable display device 1000 is in a multimedia playback mode (S130), the main processor may operate both the sound output unit 510 and the vibration output unit 520 to be used as a speaker (S140). In this case, mid-to-high frequency sound data for outputting sound of a mid-to-high frequency band may be applied to the sound output unit 510, and low-frequency sound data for outputting sound of a low-frequency band may be applied to the vibration output unit 520. When the foldable display device 1000 is in a haptic mode (S150), the main processor may operate the vibration output unit 520 to be used as a haptic device (S160).

Figure 18:
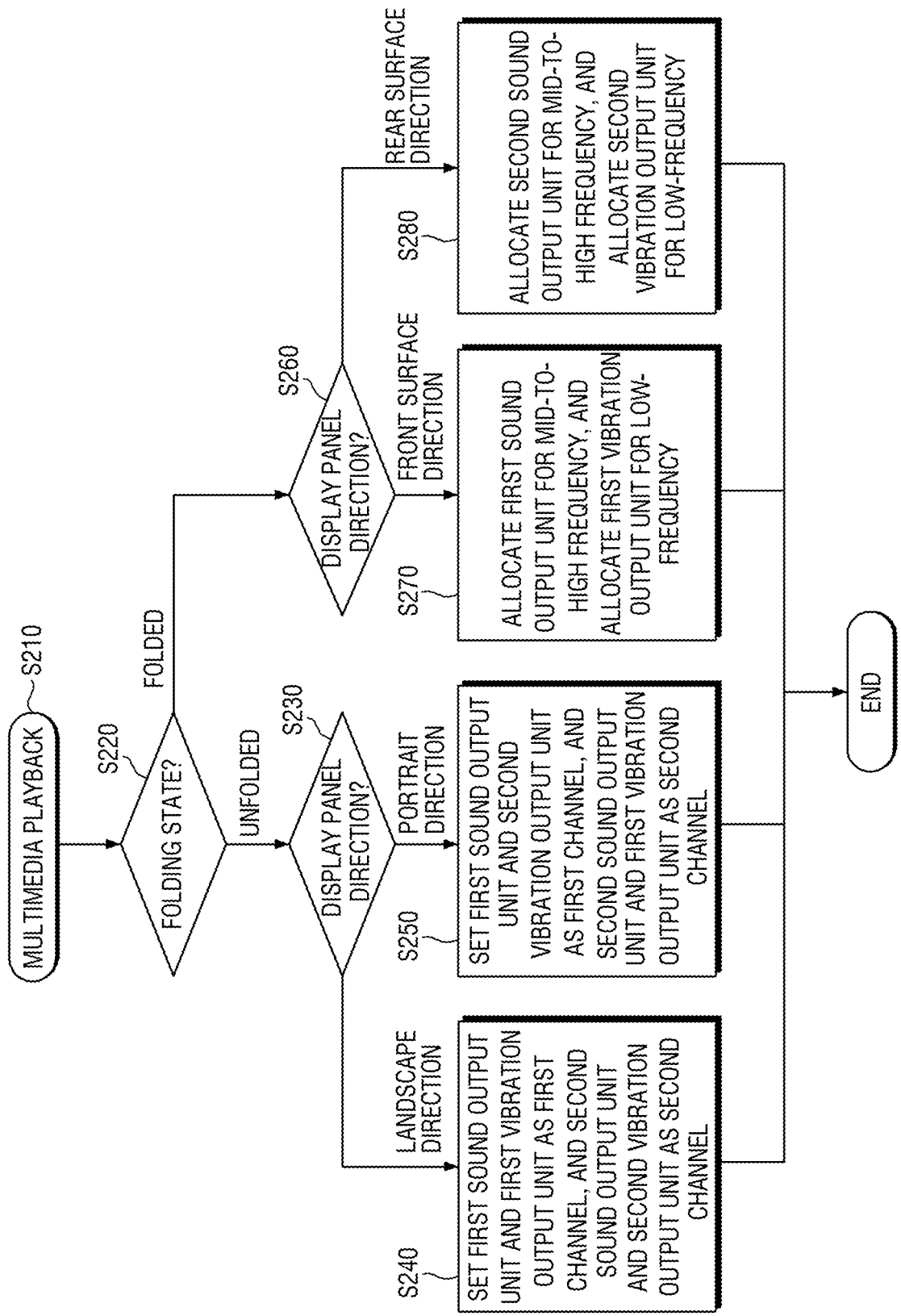
FIG. 18 is a flowchart illustrating an operation algorithm of the sound output unit and the vibration output unit according to a folding state of the display panel and a direction in which the display panel is used when the display device is in a multimedia playback mode according to some example embodiments of the present disclosure.

FIG. 18 is a flowchart illustrating an operation algorithm of the sound output unit and the vibration output unit according to a folding state of the display panel and a direction in which the display panel is used when the display device according to some example embodiments is in a multimedia playback mode.

Referring to FIG. 18, when the foldable display device 1000 is in the multimedia playback mode (S210), the main processor may use a motion detection sensor to determine a folding state of the foldable display device 1000 (S220).

When the foldable display device 1000 is in an unfolded state, the main processor may determine in which direction the user is using the foldable display device 1000 through the motion detection sensor (S230).

When the main processor determines that the user uses the foldable display device 1000 in a landscape mode, the main processor may set the first sound output unit 510A and the first vibration output unit 520A as a first channel that is for a left stereo sound, and may set the second sound output unit 510B and the second vibration output unit 520B as a second channel that is for a right stereo sound (S240). The main processor may apply the mid-to-high frequency sound data for outputting the sound of a mid-to-high frequency band to the first sound output unit 510A that is allocated to the first channel, and may apply the low-frequency sound data for outputting the sound of a low-frequency band to the first vibration output unit 520A that is allocated to the first channel. In addition, the main processor may apply the mid-to-high frequency sound data for outputting the sound of a mid-to-high frequency band to the second sound output unit 510B that is allocated to the second channel, and may apply the low-frequency sound data for outputting the sound of a low-frequency band to the second vibration output unit 520B that is allocated to the second channel. Thus, the foldable display device 1000 may provide the user with 2.2-channel stereoscopic sound.

When the main processor determines that the user uses the foldable display device 1000 in a portrait mode, the main processor may set the first sound output unit 510A and the second vibration output unit 520B as a first channel that is for a left stereo sound, and may set the second sound output unit 510B and the first vibration output unit 520A as a second channel that is for a right stereo sound (S250). The main processor may apply the mid-to-high frequency sound data for outputting the sound of a mid-to-high frequency band to the first sound output unit 510A that is allocated to the first channel, and may apply the low-frequency sound data for outputting the sound of a low-frequency band to the second vibration output unit 520B that is allocated to the first channel. In addition, the main processor may apply the mid-to-high frequency sound data for outputting the sound of a mid-to-high frequency band to the second sound output unit 510B that is allocated to the second channel, and may apply the low-frequency sound data for outputting the sound of a low-frequency band to the first vibration output unit 520A that is allocated to the second channel. Thus, the foldable display device 1000 may provide the user with 2.2-channel stereoscopic sound.

When the foldable display device 1000 is in a folded state, the main processor may determine in which direction the user is using the foldable display device 1000 through the motion detection sensor (S260).

When the main processor determines that the user uses the foldable display device 1000 in a front surface direction (for example, the first non-folded area NFA1), the main processor may apply the mid-to-high frequency sound data for outputting the sound of a mid-to-high frequency band to the first sound output unit 510A, and may apply the low-frequency sound data for outputting the sound of a low-frequency band to the first vibration output unit 520A (S270). Thus, the foldable display device 1000 may provide the user with 1.1-channel stereoscopic sound.

When the main processor determines that the user uses the foldable display device 1000 in a rear surface direction (for example, the second non-folded area NFA2), the main processor may apply the mid-to-high frequency sound data for outputting the sound of a mid-to-high frequency band to the second sound output unit 510B, and may apply the low-frequency sound data for outputting the sound of a low-frequency band to the second vibration output unit 520B (S280). Thus, the foldable display device 1000 may provide the user with 1.1-channel stereoscopic sound.

Hereinafter, additional aspects of some example embodiments will be described. In the following example embodiments, descriptions of the same configuration or elements previously described may be omitted or simplified, and differences will be mainly described.

Figure 19:
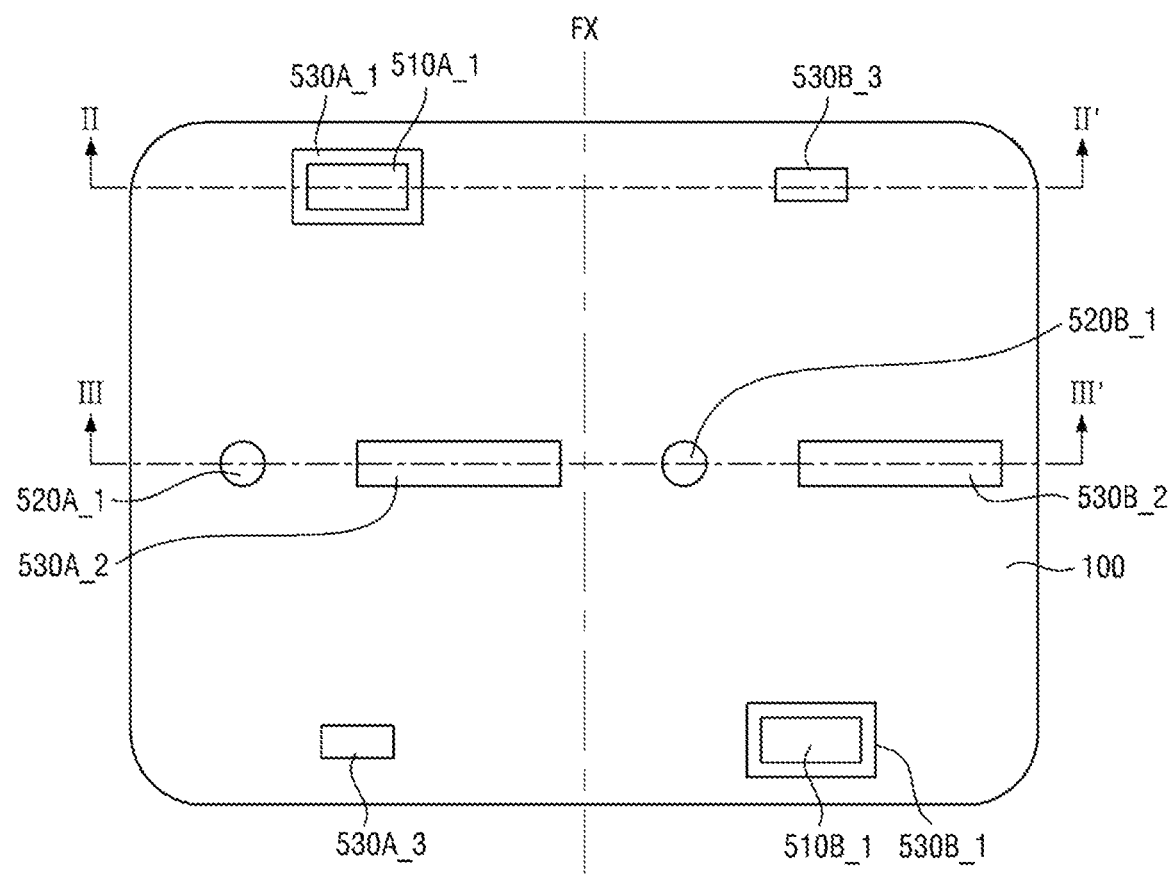
FIG. 19 is a plan view illustrating an arrangement state of a sound output unit and a vibration output unit that are located in a display panel according to some example embodiments of the present disclosure.
Figure 20:
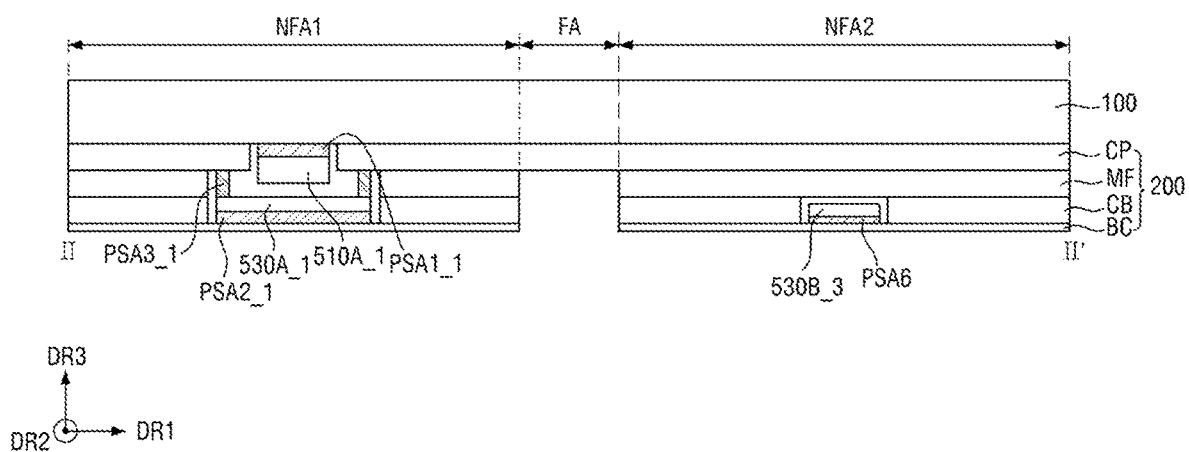
FIG. 20 is a cross-sectional view illustrating a cross-section taken along the line II-II' of FIG. 19.
Figure 21:
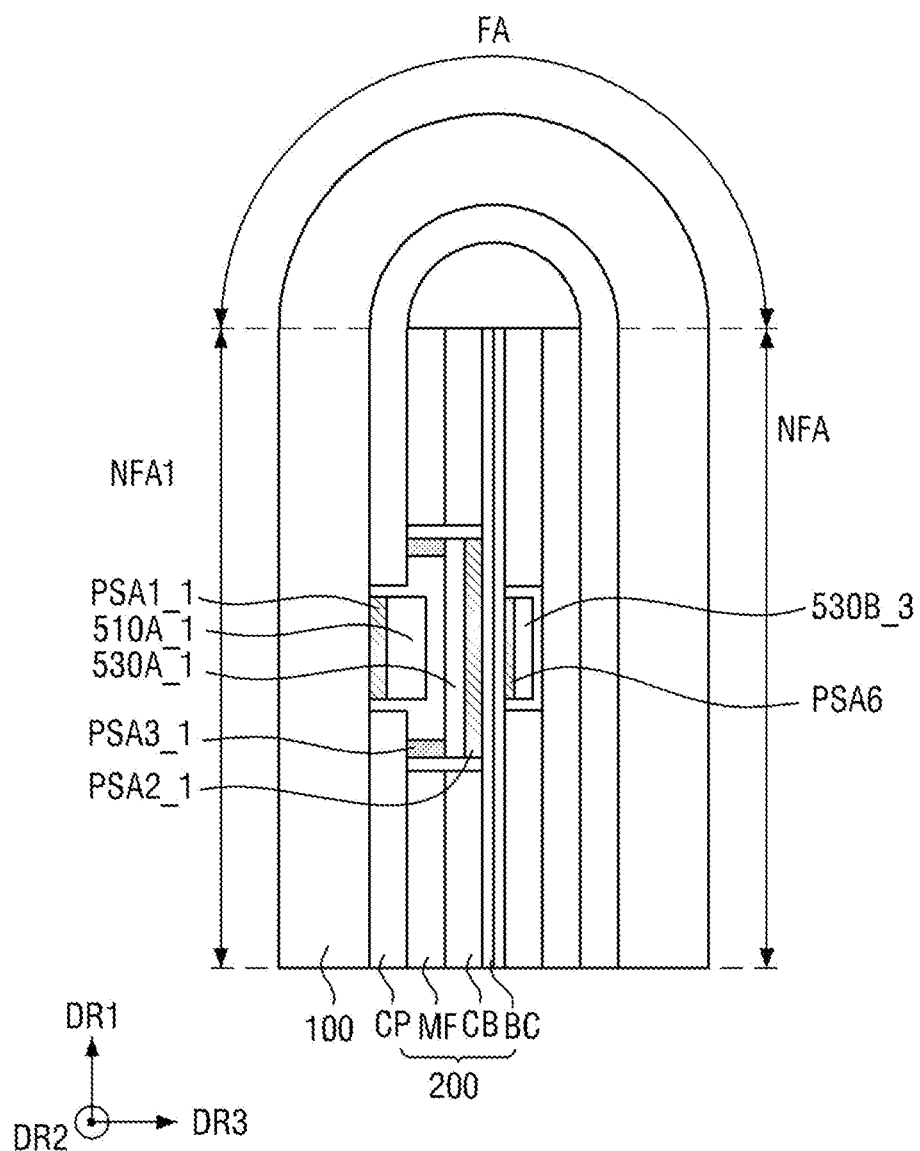
FIG. 21 is a cross-sectional view illustrating the cross-section taken along the line II-II' when the display panel of FIG. 19 is folded.
Figure 22:
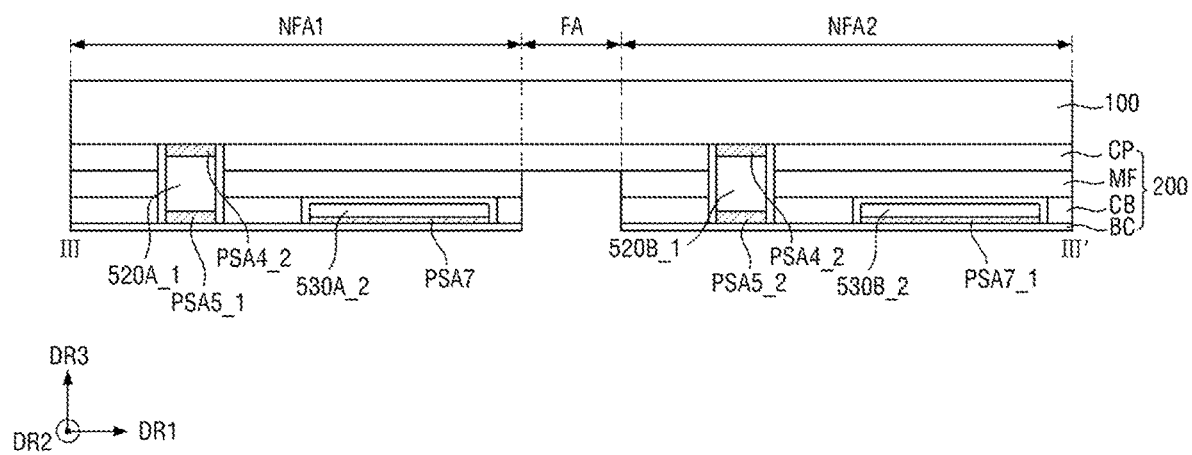
FIG. 22 is a cross-sectional view illustrating a cross-section taken along the line III-III' of FIG. 19.
Figure 23:
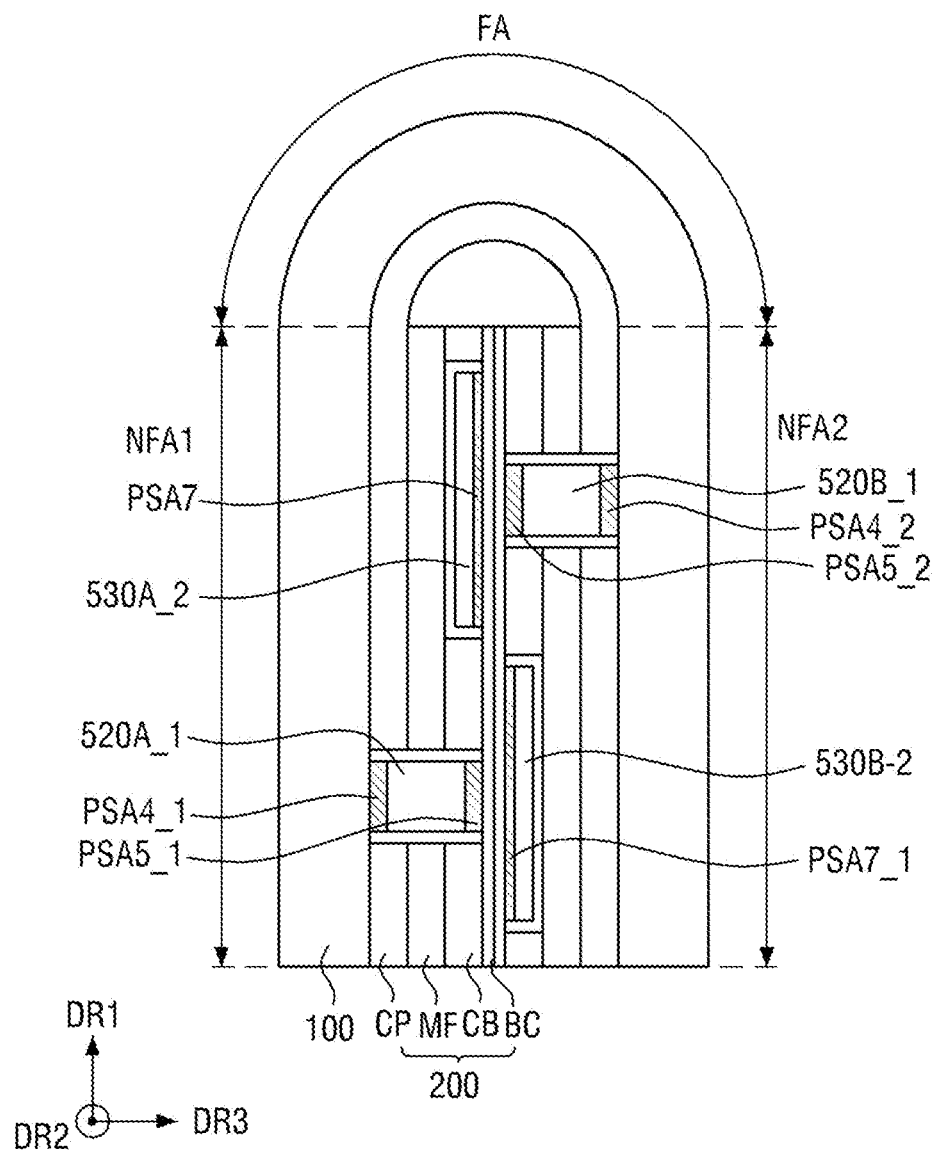
FIG. 23 is a cross-sectional view illustrating the cross-section taken along the line III-III' when the display panel of FIG. 19 is folded.
Figure 24:
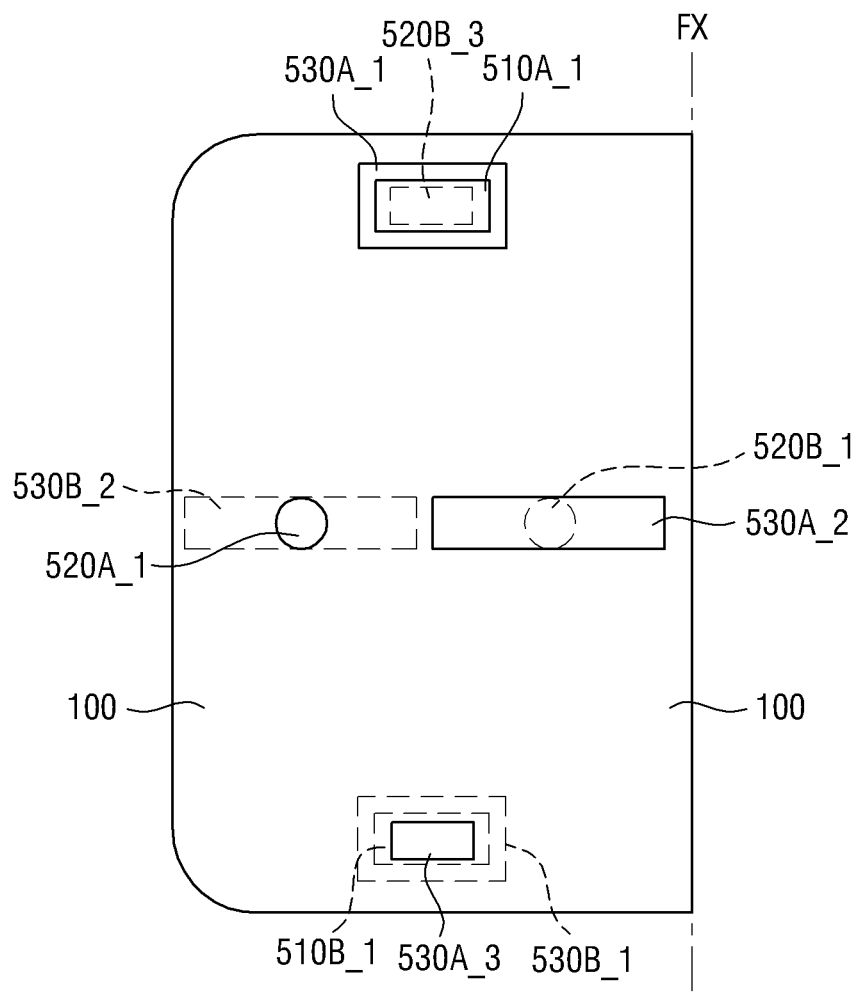
FIGS. 24 and 25 are plan views illustrating the folded state of the display panel of FIG. 19.
Figure 25:
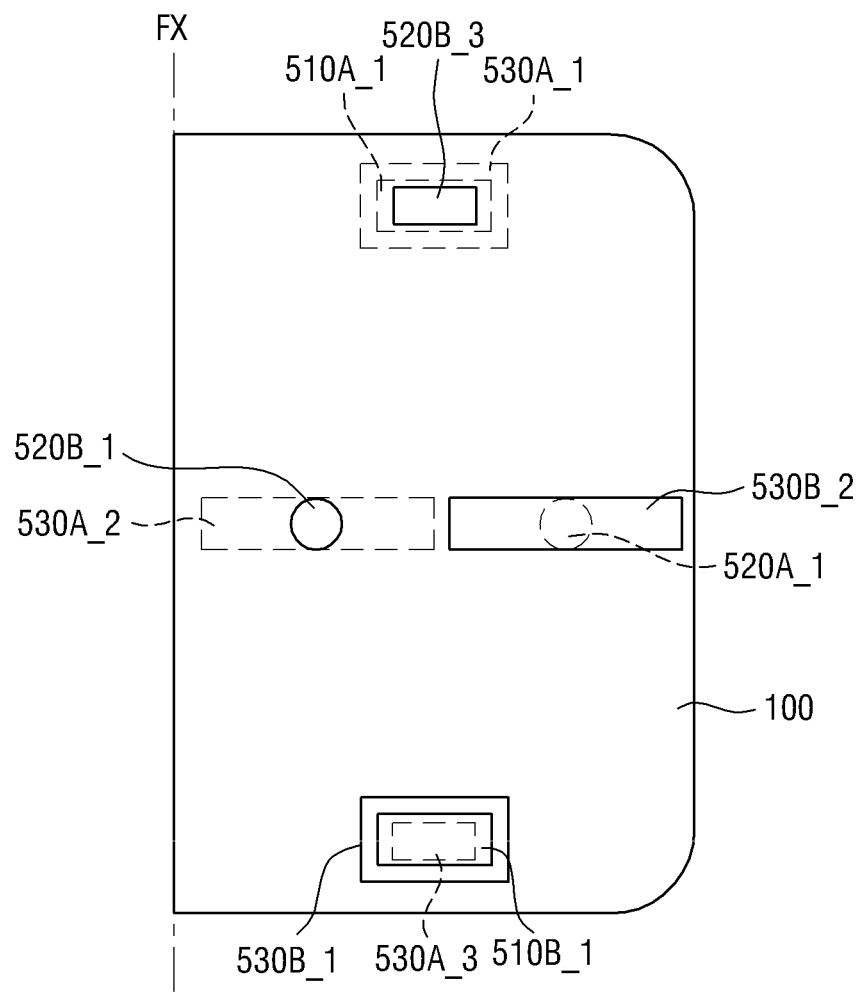

FIG. 19 is a plan view illustrating an arrangement state of a sound output unit and a vibration output unit that are arranged in a display panel according to some example embodiments. FIG. 20 is a cross-sectional view illustrating a cross-section taken along the line II-II' of FIG. 19. FIG. 21 is a cross-sectional view illustrating the cross-section taken along the line II-II' when the display panel of FIG. 19 is folded. FIG. 22 is a cross-sectional view illustrating a cross-section taken along the line III-III' of FIG. 19. FIG. 23 is a cross-sectional view illustrating the cross-section taken along the line III-III' when the display panel of FIG. 19 is folded. FIGS. 24 and 25 are plan views illustrating the folded state of the display panel of FIG. 19.

Referring to FIGS. 19 to 25, the example embodiment of FIG. 19 differs from the example embodiment of FIG. 3 in that first and second fixing parts 530A_1 and 530B_1 and first and second vibration output units 520A_1 and 520B_1 are arranged such that they do not overlap each other when the foldable display device 1000 is folded, and the foldable display device 1000 according to some example embodiments further includes a sixth fixing part 530B_3, a fifth fixing part 530A_3, a fourth fixing part 530B_2, and a third fixing part 530A_2, which are arranged to overlap the first fixing part 530A_1, the second fixing part 530B_1, the first vibration output unit 520A_1, and the second vibration output unit 520B_1, respectively, when the foldable display device 1000 is folded.

In more detail, in a display module 100, a first non-folded area NFA1 and a second non-folded area NFA2 may be arranged on one side and the other side with respect to a folded area FA, respectively.

According to some example embodiments, the first non-folded area NFA1 may include the first sound output unit 510A_1, the first vibration output unit 520A_1, the first fixing part 530A_1, the third fixing part 530A_2, and the fifth fixing part 530A_3. The first sound output unit 510A_1 and the first vibration output unit 520A_1 may be directly attached to a lower surface of the display module 100 by an adhesive member such as a pressure-sensitive adhesive. For example, the first sound output unit 510A_1 may be attached to the lower surface of the display module 100 by a first adhesive member PSA1_1. That is, the first sound output unit 510A_1 and the first vibration output unit 520A_1 may be arranged such that they do not overlap a cover panel CP, which is located on the lower surface of the display module 100, in a third direction DR3. The first sound output unit 510A_1 may be arranged to be adjacent to an upper side of the display module 100, and the first vibration output unit 520A_1 may be arranged to be adjacent to a left side of the display module 100 at an intermediate point of the display module 100 in a second direction DR2. However, the position of the first sound output unit 510A_1 and the position of the first vibration output unit 520A_1 are not limited to those illustrated in FIG. 19.

The first sound output unit 510A_1 may include a receiver configured to output a voice of the other party in a call mode or a speaker configured to output music in a multimedia playback mode. When it is in a haptic mode, the first vibration output unit 520A_1 may generate various vibrations that may be felt by a user. The intensity and pattern of the generated vibration may be controlled by the selection of the user or the setting of the main processor. For example, different vibrations may be combined with each other and output, or may be sequentially output.

However, the first vibration output unit 520A_1 may include a speaker that not only generates vibration but also outputs music in a multimedia playback mode.

The first fixing part 530A_1 may be arranged to overlap the first sound output unit 510A_1 in the third direction DR3. In addition, the first fixing part 530A_1 may be spaced apart (e.g., by a set or predetermined distance) from the first sound output unit 510A_1 in the third direction DR3. This is because, as shown in FIGS. 7 to 9, the first sound output unit 510A_1 is a device that generates sound by vibrating the display module 100 up and down, so that one side surface of the first sound output unit 510A_1 is fixed to the display module 100 but the other side surface of the first sound output unit 510A_1, which is the surface opposite to the one side surface, may not be fixed.

The first fixing part 530A_1 may be arranged such that it does not overlap a middle frame MF and a circuit board CB in the third direction DR3 and may be arranged to overlap a bottom cover BC in the third direction DR3. That is, the first fixing part 530A_1 may be located in a space occupied by the middle frame MF and the circuit board CB in the third direction DR3. For example, one surface of the first fixing part 530A_1 may be attached to the bottom cover BC by a second adhesive member PSA2_1. In addition, the other surface of the first fixing part 530A_1 may be attached to the middle frame MF by a third adhesive member PSA3_1.

The first fixing part 530A_1 may be made of a magnetic material and may be configured to be detachable from the sixth fixing part 530B_3 to be described later. According to some example embodiments, the first fixing part 530A_1 may include a magnetic material. For example, the magnetic material may include a permanent magnet. In this case, the magnetic material may always maintain a magnetic force. The sixth fixing part 530B_3 may also include a magnetic material. Accordingly, when the foldable display device 1000 is folded, an attractive force due to a magnetic force may act between the first fixing part 530A_1 and the sixth fixing part 530B_3.

The sixth fixing part 530B_3 may be arranged to overlap the cover panel CP, the middle frame MF, and the bottom cover BC in the third direction DR3, and may be arranged to not overlap the circuit board CB in the third direction DR3. That is, the sixth fixing part 530B_3 may be located in a space occupied by the circuit board CB in the third direction DR3. For example, one surface of the sixth fixing part 530B_3 may be attached to the bottom cover BC by a sixth adhesive member PSA6_1.

The second non-folded area NFA2 may include a second sound output unit 510B_1, a second vibration output unit 520B_1, a second fixing part 530B_1, a fourth fixing part 530B_2, and a sixth fixing part 530B_3. The second sound output unit 510B_1 and the second vibration output unit 520B_1 may be attached to the lower surface of the display module 100 by an adhesive member such as a pressure-sensitive adhesive. For example, the second sound output unit 510B_1 may be attached to the lower surface of the display module 100 by a fourth adhesive member PSA4_2. That is, the second sound output unit 510B_1 and the second vibration output unit 520B_1 may be arranged to not overlap the cover panel CP, which is located on the lower surface of the display module 100, in the third direction DR3. The second sound output unit 510B_1 may be arranged to be adjacent to the lower side of the display module 100, and the second vibration output unit 520B_1 may be arranged to be adjacent to a folding axis FX at the intermediate point of the display module 100 in the second direction DR2.

The second vibration output unit 520B_1 and the third fixing part 530A_2 may be symmetrical with respect to the folding axis FX, such that the second vibration output unit 520B_1 overlaps the third fixing part 530A_2 in the third direction DR3 when the display module 100 is folded. Here, the third fixing part 530A_2 may be arranged to be adjacent to the folding axis FX at the intermediate point of the display module 100 in the second direction DR2 and may be arranged with a length corresponding to half a length of the first non-folded area NFA1 in the first direction DR1. However, embodiments according to the present disclosure are not limited thereto, and the third fixing part 530A_2 may be further extended to be adjacent to the first vibration output unit 520A_1. The third fixing part 530A_2 may be arranged to overlap the cover panel CP, the middle frame MF, and the bottom cover BC in the third direction DR3, and may be arranged to not overlap the circuit board CB in the third direction DR3. That is, the third fixing part 530A_2 may be located in a space occupied by the circuit board CB in the third direction DR3. For example, one surface of the third fixing part 530A_2 may be attached to the bottom cover BC by a seventh adhesive member PSA7_1.

The third fixing part 530A_2 may be made of a magnetic material and may be configured to be detachable from the second vibration output unit 520B_1. According to some example embodiments, the third fixing part 530A_2 may include a magnetic material. For example, the magnetic material may include a permanent magnet. In this case, the magnetic material may always maintain a magnetic force. That is, the second vibration output unit 520B_1 may include a magnet 614. Accordingly, when the foldable display device 1000 is folded, an attractive force due to a magnetic force may act between the third fixing part 530A_2 and the second vibration output unit 520B_1.

The function and arrangement form of the fourth fixing part 530B_2 and the fifth fixing part 530A_3 are the same as the function and arrangement form of the third fixing part 530A_2 and the sixth fixing part 530B_3, and thus, detailed descriptions thereof will be omitted.

Figure 26:
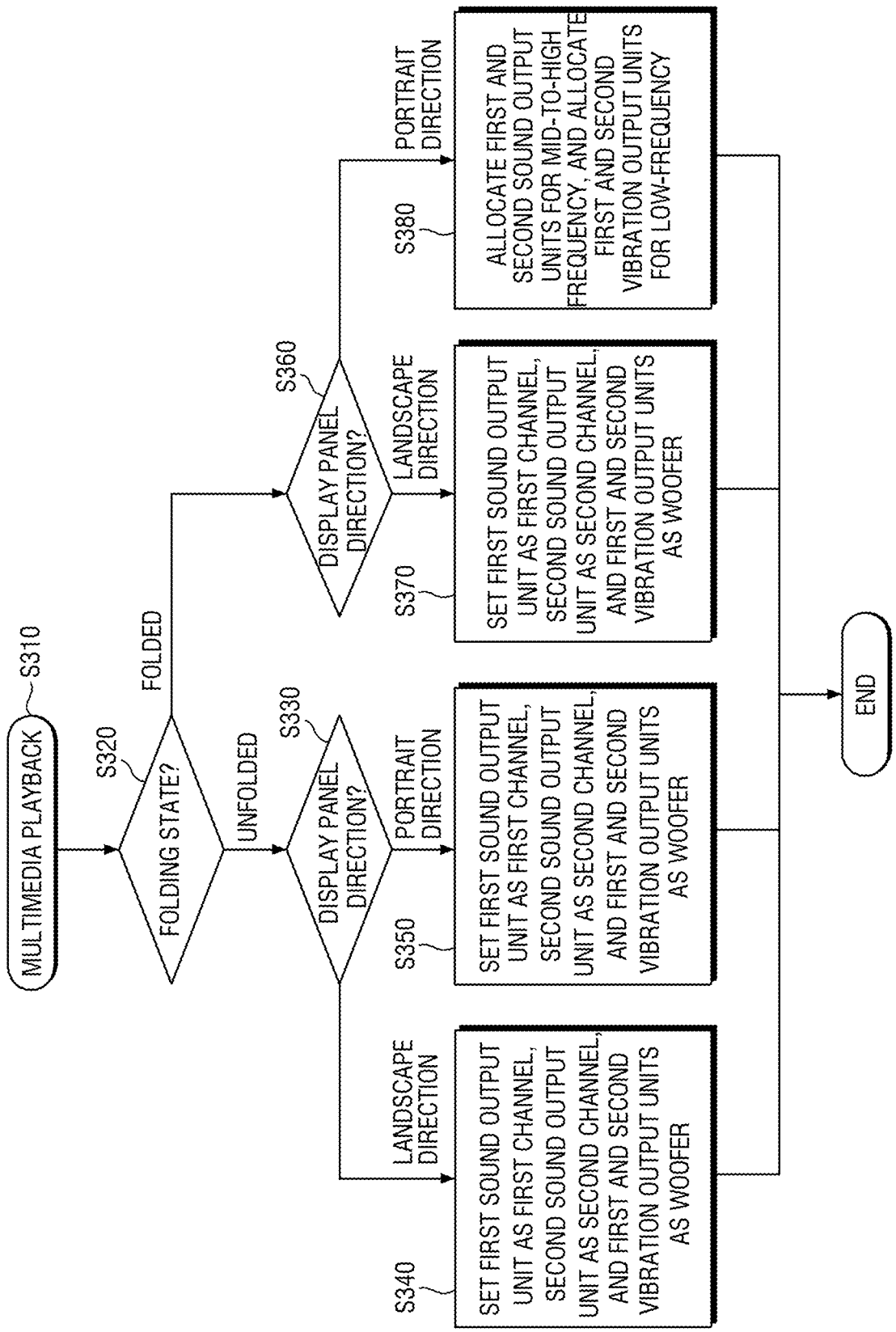
FIG. 26 is a flowchart illustrating an operation algorithm of the sound output unit and the vibration output unit according to a folding state of the display panel and a direction in which the display panel is used when the display device is in a multimedia playback mode according to some example embodiments of the present disclosure.

FIG. 26 is a flowchart illustrating an operation algorithm of the sound output unit and the vibration output unit according to a folding state of the display panel and a direction in which the display panel is used when the display device according to some example embodiments is in a multimedia playback mode.

Referring to FIG. 26, when the foldable display device 1000 is in the multimedia playback mode (S310), the main processor may use a motion detection sensor to determine a folding state of the foldable display device 1000 (S320).

When the foldable display device 1000 is in an unfolded state, the main processor may determine in which direction the user is using the foldable display device 1000 through the motion detection sensor (S330).

When the main processor determines that the user uses the foldable display device 1000 in a landscape mode, the main processor may set the first sound output unit 510A_1 as a first channel that is for a left stereo sound, may set the second sound output unit 510B_1 as a second channel that is for a right stereo sound, and may set the first and second vibration output units 520A_1 and 520B_1 as a woofer (S340). The main processor may apply mid-to-high frequency sound data for outputting sound of a mid-to-high frequency band to the first sound output unit 510A_1 that is allocated to the first channel, may apply the mid-to-high frequency sound data for outputting the sound of a mid-to-high frequency band to the second sound output unit 510B_1 that is allocated to the second channel, and may apply low-frequency sound data for outputting sound of a low-frequency band to the first and second vibration output units 520A_1 and 520B_1. Thus, the foldable display device 1000 may provide the user with 2.1-channel stereoscopic sound.

When the main processor determines that the user uses the foldable display device 1000 in a portrait mode, the main processor may set the first sound output unit 510A_1 as a first channel that is for a left stereo sound, may set the second sound output unit 510B_1 as a second channel that is for a right stereo sound, and may set the first and second vibration output units 520A_1 and 520B_1 as a woofer (S350). The main processor may apply the mid-to-high frequency sound data for outputting the sound of a mid-to-high frequency band to the first sound output unit 510A_1 that is allocated to the first channel, may apply the mid-to-high frequency sound data for outputting the sound of a mid-to-high frequency band to the second sound output unit 510B_1 that is allocated to the second channel, and may apply the low-frequency sound data for outputting the sound of a low-frequency band to the first and second vibration output units 520A_1 and 520B_1. Thus, the foldable display device 1000 may provide the user with 2.1-channel stereoscopic sound.

When the foldable display device 1000 is in a folded state, the main processor may determine in which direction the user is using the foldable display device 1000 through the motion detection sensor (S360).

When the main processor determines that the user uses the foldable display device 1000 in a landscape mode while looking at a front surface or rear surface of the foldable display device 1000, the main processor may set the first sound output unit 510A_1 as a first channel that is for a left stereo sound, may set the second sound output unit 510B_1 as a second channel that is for a right stereo sound, and may set the first and second vibration output units 520A_1 and 520B_1 as a woofer (S370). The main processor may apply the mid-to-high frequency sound data for outputting the sound of a mid-to-high frequency band to the first sound output unit 510A_1 that is allocated to the first channel, may apply the mid-to-high frequency sound data for outputting the sound of a mid-to-high frequency band to the second sound output unit 510B_1 that is allocated to the second channel, and may apply the low-frequency sound data for outputting the sound of a low-frequency band to the first and second vibration output units 520A_1 and 520B_1. Thus, the foldable display device 1000 may provide the user with 2.1-channel stereoscopic sound.

In this case, the first vibration output unit 520A_1 and the fourth fixing part 530B_2 may be coupled to the second vibration output unit 520B_1 and the third fixing part 530A_2, respectively, by a magnetic force, so that the display module 100 may be divided into two regions and vibrate.

When the main processor determines that the user uses the foldable display device 1000 in a portrait mode while looking at the front surface or rear surface of the foldable display device 1000, the main processor may apply the mid-to-high frequency sound data for outputting the sound of a mid-to-high frequency band to the first sound output unit 510A_1, and may apply the low-frequency sound data for outputting the sound of a low-frequency band to the first vibration output unit 520A_1 (S380). Thus, the foldable display device 1000 may provide the user with 1.1-channel stereoscopic sound. The same applies to the second sound output unit 510B_1 and the second vibration output unit 520B_1.

Thus, as described above, a display device according to various embodiments may be configured to detect or determine the relative orientation of the display device, and also whether the display device is in a folded state or an unfolded state, and based on the orientation and folded-state determination, adjust the audio or sound output by the display device.

Although certain example embodiments and implementations have been described herein, other embodiments and modifications will be apparent from this description. Accordingly, the inventive concepts are not limited to such embodiments, but rather to the broader scope of the appended claims, and their equivalents, and various modifications and equivalent arrangements as would be apparent to a person of ordinary skill in the art.

What is claimed is:

1. A foldable display device comprising:
    a display panel including a first area disposed on one side of a folding axis, and a second area disposed on the other side of the folding axis;
    a lower member below the display panel;
    a first sound output unit on a lower surface of the first area;
    a first fixing part above the lower surface of the first area and overlapping the first sound output unit in a thickness direction; and
    a first vibration output unit on a lower surface of the second area, wherein the first sound output unit and the first fixing part are spaced apart from each other in the thickness direction.

2. The foldable display device of claim 1, wherein the first fixing part comprises a magnetic material having a magnetic force.

3. The foldable display device of claim 1, wherein the lower member comprises:
    a cover panel below the display panel;
    a middle frame below the cover panel;

a circuit board below the middle frame; and
a bottom cover below the circuit board.

4. The foldable display device of claim 3, wherein the first sound output unit and the first vibration output unit do not overlap the cover panel in the thickness direction and are coupled to the display panel by a first adhesive member.

5. The foldable display device of claim 3, wherein the first fixing part does not overlap the middle frame and the circuit board.

6. The foldable display device of claim 5, wherein the first fixing part overlaps the bottom cover, and a first surface of the first fixing part is coupled to the bottom cover by a second adhesive member.

7. The foldable display device of claim 6, wherein a second surface of the first fixing part, which is a surface opposite to the first surface of the first fixing part, is coupled to the cover panel by a third adhesive member.

8. The foldable display device of claim 3, wherein the first vibration output unit does not overlap the cover panel, the middle frame, and the circuit board in the thickness direction.

9. The foldable display device of claim 8, wherein a first surface of the first vibration output unit is coupled to the display panel by a fourth adhesive member, and a second surface of the first vibration output unit, which is a surface opposite to the first surface of the first vibration output unit, is coupled to the bottom cover by a fifth adhesive member.

10. The foldable display device of claim 1, wherein the first vibration output unit comprises a lower chassis, a flexible circuit board, a voice coil, a magnet, a spring, and an upper chassis.

11. The foldable display device of claim 1, wherein the first sound output unit is configured to generate sound in a mid-to-high frequency band, and the first vibration output unit is configured to generate sound in a low-frequency band.

12. The foldable display device of claim 1, further comprising a second vibration output unit on the lower surface of the first area, a second sound output unit on the lower surface of the second area, and a second fixing part above the lower surface of the second area to overlap the second sound output unit in the thickness direction.

13. The foldable display device of claim 12, wherein the second fixing part and the second vibration output unit are symmetrical with respect to the folding axis.

14. The foldable display device of claim 12, wherein the second fixing part comprises a magnetic material having a magnetic force, and the second vibration output unit comprises a lower chassis, a flexible circuit board, a voice coil, a magnet, a spring, and an upper chassis.

15. A foldable display device comprising:
a display panel including a first area disposed on one side of a folding axis, and a second area disposed on the other side of the folding axis;
a lower member below the display panel;
a first sound output unit on a lower surface of the first area;
a first fixing part above the lower surface of the first area to overlap the first sound output unit in a thickness direction;
a second fixing part above the lower surface of the first area;
a first vibration output unit on the lower surface of the first area at a position between the first sound output unit and the second fixing part;
a third fixing part above the lower surface of the first area at a position between the first sound output unit and the second fixing part;
a second sound output unit on a lower surface of the second area;
a fourth fixing part above the lower surface of the second area to overlap the second sound output unit in the thickness direction;
a fifth fixing part above the lower surface of the second area;
a second vibration output unit on the lower surface of the second area at a position between the second sound output unit and the fourth fixing part; and
a sixth fixing part above the lower surface of the second area at a position between the second sound output unit and the fourth fixing part.

16. The foldable display device of claim 15, wherein each of the first to sixth fixing parts comprises a magnetic material having a magnetic force.

17. The foldable display device of claim 15, wherein each of the first and second vibration output units comprises a lower chassis, a flexible circuit board, a voice coil, a magnet, a spring, and an upper chassis.

18. The foldable display device of claim 15, wherein the lower member comprises:
a cover panel below the display panel;
a middle frame below the cover panel;
a circuit board below the middle frame; and
a bottom cover below the circuit board.

19. The foldable display device of claim 18, wherein the first fixing part and the fourth fixing part do not overlap the middle frame and the circuit board.

* * * * *